United States Patent
Ye et al.

(10) Patent No.: US 11,943,803 B2
(45) Date of Patent: Mar. 26, 2024

(54) SYSTEMS AND METHODS FOR NETWORK-SIDE UL CANCELLATION USING INTERLACED FREQUENCY RESOURCE ALLOCATION

(71) Applicant: Apple Inc., Cupertino, CA (US)

(72) Inventors: Sigen Ye, Whitehouse Station, NJ (US); Weidong Yang, San Diego, CA (US); Oghenekome Oteri, San Diego, CA (US); Haitong Sun, Cupertino, CA (US); Chunhai Yao, Beijing (CN); Yushu Zhang, Beijing (CN); Dawei Zhang, Saratoga, CA (US); Chunxuan Ye, San Diego, CA (US); Wei Zeng, Saratoga, CA (US); Hong He, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/593,816

(22) PCT Filed: Sep. 24, 2020

(86) PCT No.: PCT/CN2020/117424
§ 371 (c)(1),
(2) Date: Sep. 24, 2021

(87) PCT Pub. No.: WO2022/061648
PCT Pub. Date: Mar. 31, 2022

(65) Prior Publication Data
US 2023/0217483 A1    Jul. 6, 2023

(51) Int. Cl.
*H04W 72/00* (2023.01)
*H04W 72/23* (2023.01)
*H04W 72/566* (2023.01)

(52) U.S. Cl.
CPC ......... *H04W 72/566* (2023.01); *H04W 72/23* (2023.01)

(58) Field of Classification Search
None
See application file for complete search history.

(56) References Cited

U.S. PATENT DOCUMENTS

2019/0342874 A1\* 11/2019 Davydov .............. H04W 72/23
2020/0100257 A1    3/2020 Yang
(Continued)

FOREIGN PATENT DOCUMENTS

| CN | 109845383 A | 6/2019 |
| CN | 110535568 A | 12/2019 |

(Continued)

OTHER PUBLICATIONS

Lenovo, et al., "UL signals and channels for NR-U," 3GPP Draft, R1-1910155, vol. RAN WG1 #98bis, Oct. 4, 2019, Retrieved from the Internet: URL: http://www.3gpp.org/ftp/tsg_ran/WG1_RL1/TSGR1_98b/Docs/R1-1910155.zip [retrieved on Oct. 5, 2019].

(Continued)

*Primary Examiner* — Gerald A Smarth
(74) *Attorney, Agent, or Firm* — Blank Rome LLP

(57) ABSTRACT

A method for wireless communication includes: scheduling, by a wireless station, a first uplink (UL) transmission from a wireless device; determining, by the wireless station, a need for a higher priority uplink transmission that uses resources overlapping with the first UL transmission; determining, by the wireless station, a reference region, within which a UL cancellation indication (CI) is to be applied; determining, by the wireless station, a set of UL resources in the reference region for cancellation, wherein at least a subset of the UL resources in the reference region are interlaced; sending, via a downlink control channel, indication of the determined set of UL resources for cancellation (e.g., by indicating particular interlaces and/or particular Physical Resource Blocks within such interlaces that are to be canceled); and receiving, at the wireless station, the higher priority uplink transmission via at least a subset of the determined set of cancelled UL resources.

20 Claims, 14 Drawing Sheets

(56) References Cited

U.S. PATENT DOCUMENTS

| | | |
|---|---|---|
| 2020/0259601 A1 | 8/2020 | Zhou |
| 2020/0351897 A1 | 11/2020 | Fakoorian |
| 2021/0076358 A1 | 3/2021 | Luo |
| 2021/0329679 A1 | 10/2021 | Hosseini |
| 2021/0352678 A1 | 11/2021 | Taherzadeh Boroujeni |
| 2022/0086850 A1 | 3/2022 | Huang |
| 2022/0166586 A1* | 5/2022 | Kundu ............... H04L 27/0006 |
| 2022/0330217 A1 | 10/2022 | Xiao |
| 2023/0171779 A1 | 6/2023 | Xu |

FOREIGN PATENT DOCUMENTS

| | | | | |
|---|---|---|---|---|
| CN | 111684855 A | | 9/2020 | |
| JP | 2017184202 A | | 10/2017 | |
| WO | WO-2016163848 A1 | * | 10/2016 | ............ H04W 72/02 |
| WO | 2018022229 A1 | | 2/2018 | |
| WO | WO-2019184681 A1 | * | 10/2019 | ........ H04W 72/0453 |
| WO | 2020033660 A1 | | 2/2020 | |
| WO | 2020065893 A1 | | 4/2020 | |

OTHER PUBLICATIONS

Wilus Inc., "On UL cancellation scheme for NR URLLC," 3GPP R1-1911318, vol. RAN WG1 #98bis, Oct. 8, 2019, Retrieved from the Internet: URL: https://ftp.3gpp.org/tsg_ran/WG1_RL1/TSGR1_98b/Docs/R1-1911318.zip [retrieved on Oct. 30, 2019].

Ericsson, "Remaining Issues of Inter-UE Prioriization and Multi-plexing of UL Transmissions," 3GPP Draft, R1-2001788, vol. RAN WG1, No. e-Meeting, Apr. 11, 2020.

Spreadtrum Communications, "Remaining issues of enhanced inter UE Tx prioritization/multiplexing," 3GPP Draft, R1-2002257, vol. RAN WG1, No. e-Meeting, Apr. 11, 2020.

Qualcomm Incorporated, "Discussion on NR Rel-16 UE features," 3GPP TSG RAN WG1 #102-e, R1-2006788, Aug. 28, 2020 (Aug. 28, 2020).

Vivo, "UL inter-UE Tx prioritization for URLLC," 3GPP TSG RAN WG1 Meeting #95, R1-1812318, Nov. 16, 2018 (Nov. 16, 2018).

* cited by examiner

SYSTEMS AND METHODS FOR NETWORK-SIDE UL CANCELLATION USING INTERLACED FREQUENCY RESOURCE ALLOCATION

FIELD

The present application relates to wireless devices, including apparatuses, systems, and methods to assist in the indication of the cancellation of uplink (UL) transmissions from user equipment (UE or "user device") in a cellular communications system using interlaced frequency resource allocation schemes.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

A new type of frequency resource allocation, having an "interlaced" structure (i.e., allocating repeating sets of non-contiguous frequency resources to a given UE), has been introduced for the 5G/NR Unlicensed Spectrum (NR-U). However, inter-UE uplink cancellation indication (i.e., cancellation across multiple UEs) has heretofore been defined without taking into account the availability of interlaced resource allocation, which may present inefficiencies when attempting to indicate the resources for UL cancellation, i.e., if an interlaced resource allocation has been used.

As such, apparatuses, systems, and methods are disclosed herein to improve the frequency domain indication of resources for UL cancellation indication (CI) requests, wherein, rather than having each bit in a UL CI indicator specify a contiguous set of resource blocks (RBs), the indicator may be defined to indicate one or more interlaces—and the RBs within each of said indicated interlaces—for UL cancellation. [As used herein, the term Resource Block, or RB, refers to a defined number (e.g., twelve) of consecutive subcarriers in the frequency domain (irrespective of the numerology). It is noted that, when referring herein to the RBs that are used for the actual transmission or reception of data, the term Physical Resource Block, or PRB, may also be used interchangeably with RB.]

The techniques described herein may have applicability in 3GPP Release 17 (Rel-17) and subsequent releases, particularly when the system relies on the efficient and reliable cancellation of an earlier UL resource allocation, e.g., in order to serve Industrial Internet of Things (IIoT) and/or other Ultra-reliable low-latency communication (URLLC) traffic.

Thus, according to some aspects disclosed herein, a method for wireless communication is disclosed, the method including: scheduling, by a wireless station, a first uplink transmission from a wireless device of a set of two or more wireless devices; determining, by the wireless station, a need for a higher priority uplink transmission that uses resources overlapping with the first UL transmission; determining, by the wireless station, a reference region, within which a UL cancellation indication is to be applied; determining, by the wireless station, a set of UL resources in the reference region for cancellation, wherein at least a subset of the UL resources in the reference region are interlaced; sending, via a downlink (DL) control channel, indication of the determined set of UL resources for cancellation (e.g., by indicating particular interlaces and/or particular Resource Blocks within such interlaces that are to be canceled); and receiving, at the wireless station, the higher priority uplink transmission via at least a subset of the determined set of cancelled UL resources.

According to some embodiments, the higher priority uplink transmission comprises a transmission from an Internet of Things (IoT) or URLLC device. According to other embodiments, the determined set of UL resources in the reference region for cancellation comprise UL resources in an unlicensed band of frequency spectrum. According to still other embodiments, the reference region comprises a region defined by a first frequency range and a first duration of time. According to yet other embodiments, the DL control channel comprises a Group-Common Physical Downlink Control Channel (GC-PDCCH).

In some embodiments, indicating the one or more interlaces for cancellation comprises performing at least one of the following operations: indicating one or more interlace indices directly; using resource indication value (RIV) definitions to indicate one or more interlaces (e.g., consecutive interlaces); or indicating one or more interlace indices using a bitmap. In some such embodiments, the indication of the one or more interlaces and PRBs within each of the indicated one or more interlaces for cancellation may further be based, at least in part, on a subcarrier spacing (SCS) configuration of the wireless station.

In other embodiments, indicating the PRBs within each of the indicated one or more interlaces for cancellation comprises performing at least one of the following operations: indicating one or more PRB indices using a bitmap; indicating one or more PRBs using a starting PRB index and a number of PRBs; or using RIV definitions to indicate a starting PRB index and a number of PRBs.

The techniques described herein may be implemented in and/or used with a number of different types of devices, including but not limited to cellular phones, wireless devices, wireless stations, base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings, in which.

Figure 1:
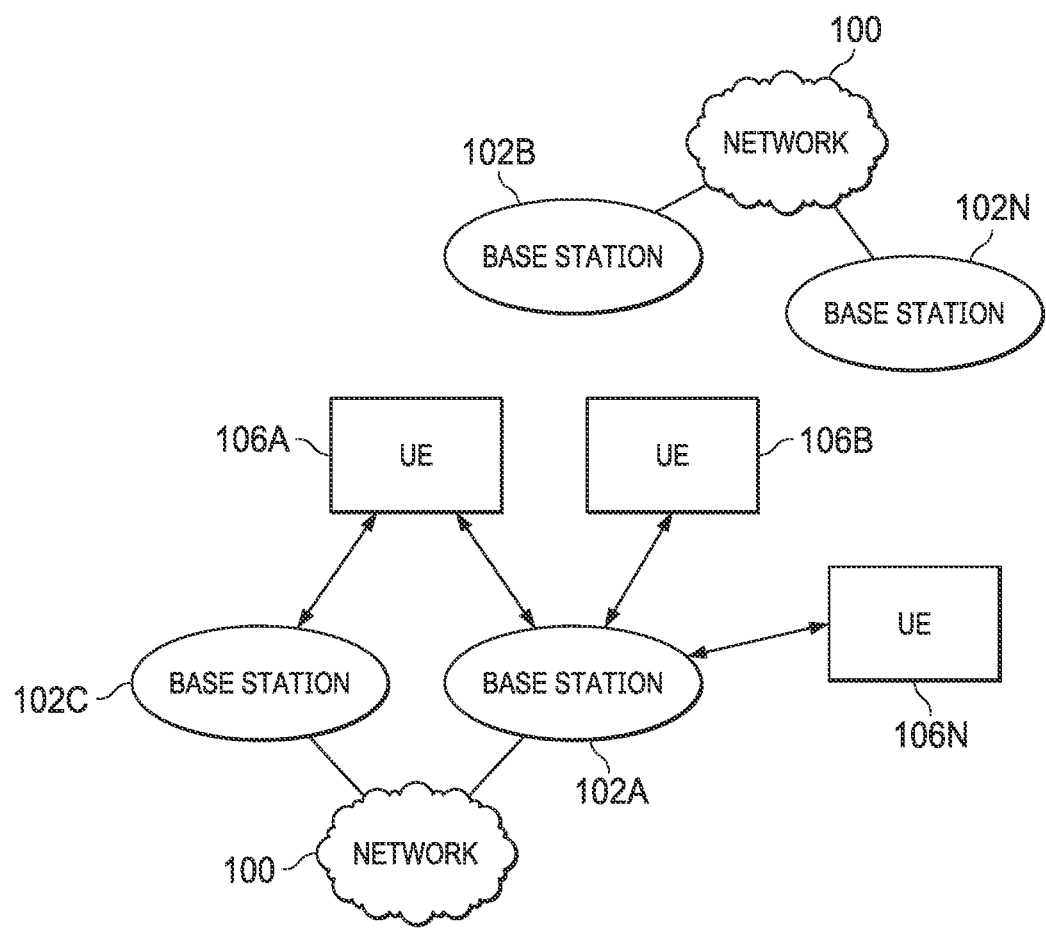
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc., a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE)(or "user device"/"UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the terms "user device," "UE," or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (or "Wireless Station")—The terms "base station" or "wireless station" have the full breadth of their ordinary meaning, and at least include a wireless communication station installed at a fixed location and used to communicate as part of a wireless telephone system or radio system. For example, if the base station or wireless station is implemented in the context of LTE, it may alternately be referred to as an "eNodeB" or "eNB." If the base station or wireless station is implemented in the context of 5G NR, it may alternately be referred to as a "gNodeB" or "gNB."

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station" or "wireless station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE. LTE-Advanced (LTE-A), 5G new radio (5G NR). HSPA, 3GPP2 CDMA2000 (e.g., 1×RTT, 1×EV-DO, HRPD, eHRPD), etc.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR. HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
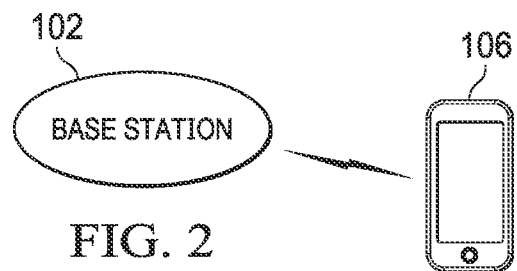
FIG. 2 illustrates a base station (BS) in communication with a user equipment device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the methods described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the methods described herein, or any portion of any of the methods described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Example Communication Device

Figure 3:
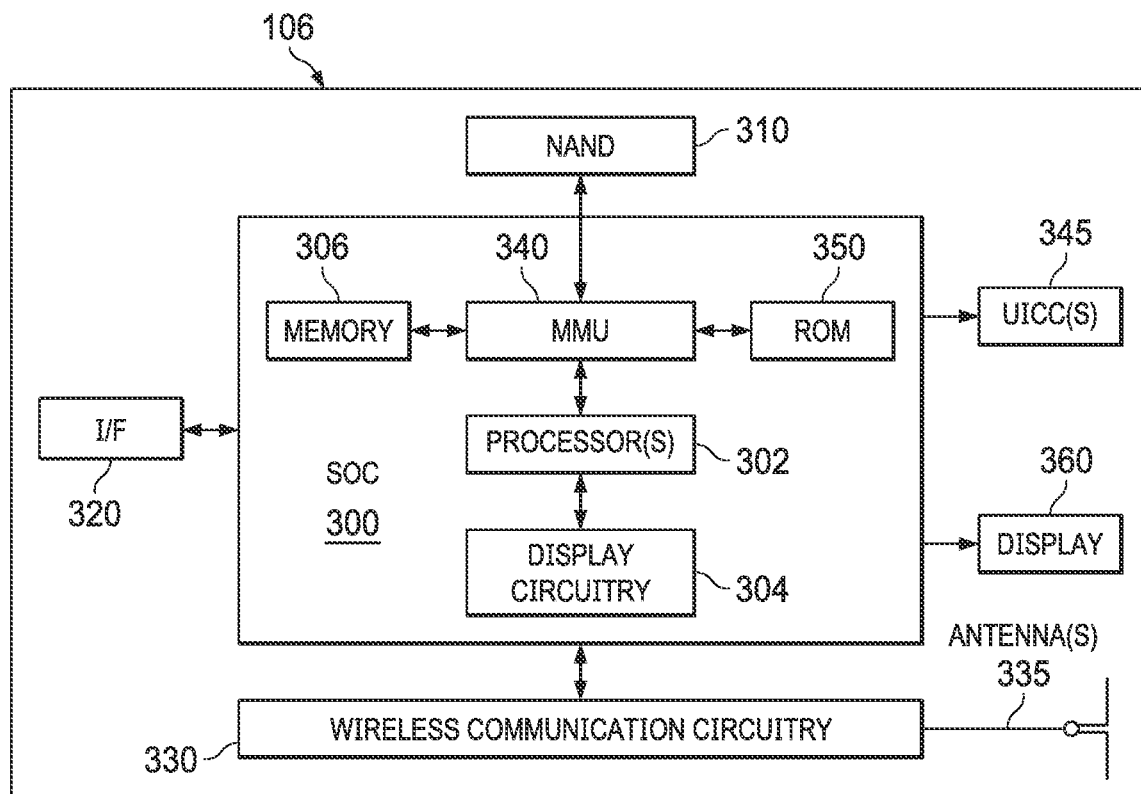
FIG. 3 illustrates an example block diagram of a UE, according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR. UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively, directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively, directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
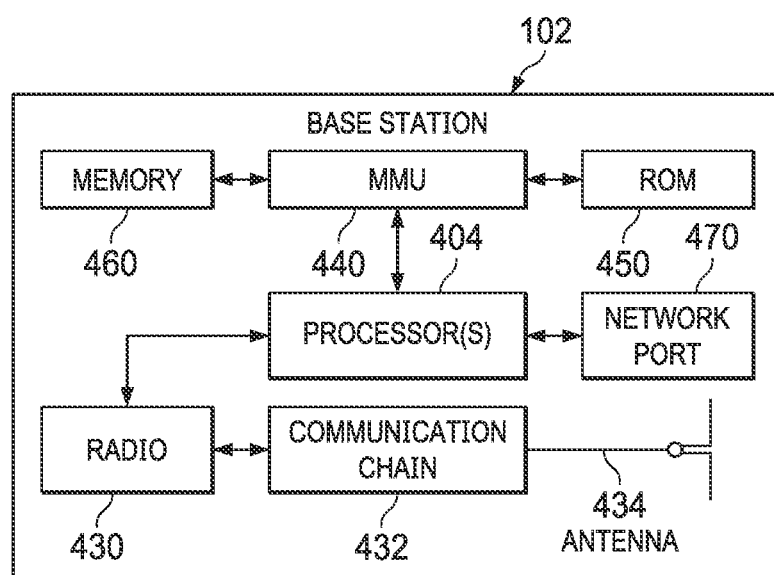
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
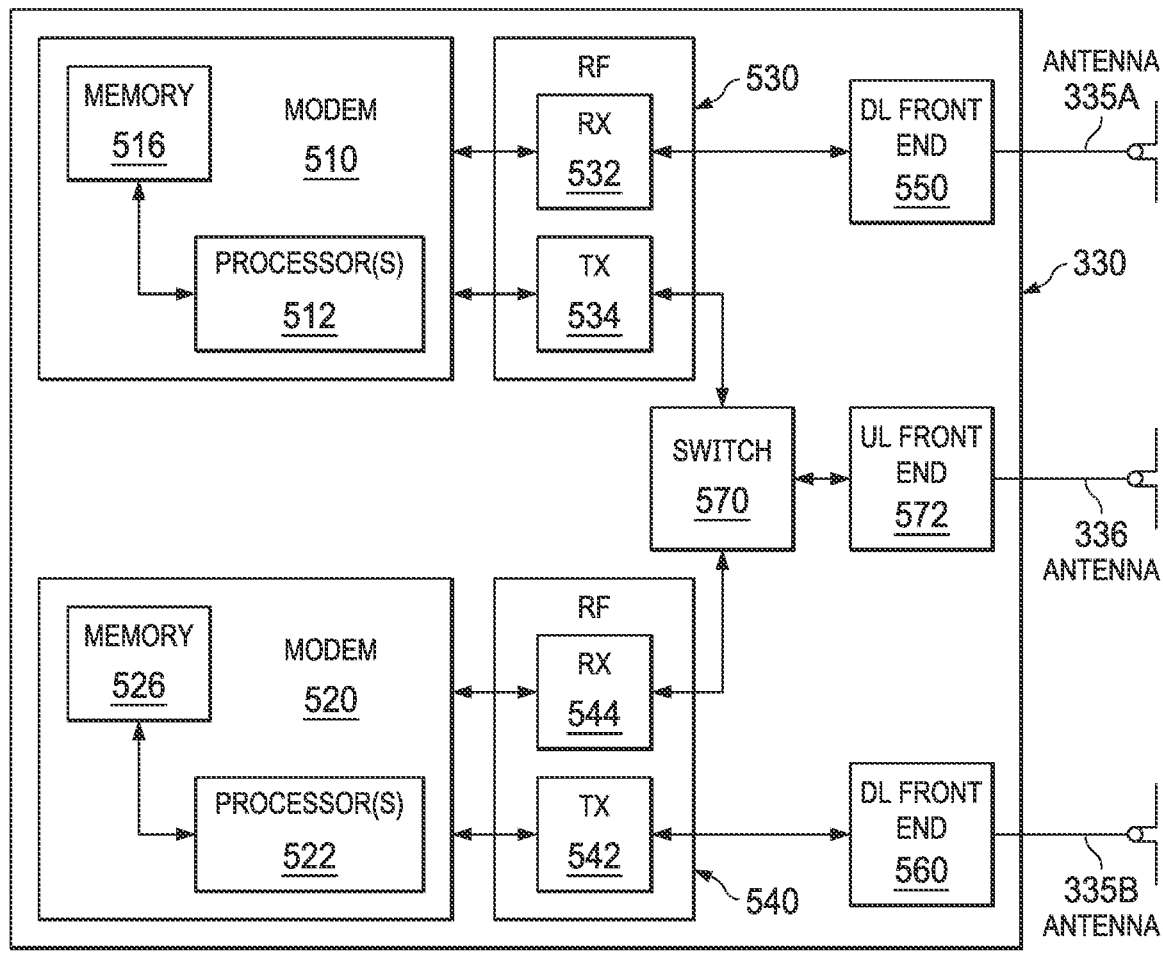
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335*b*.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some aspects, the cellular communication circuitry 330 may also not include the switch 570, and the RF front end 530 or the RF front end 540 may be in communication, e.g., directly, with the UL front end 572.

Example Network Element

Figure 6:
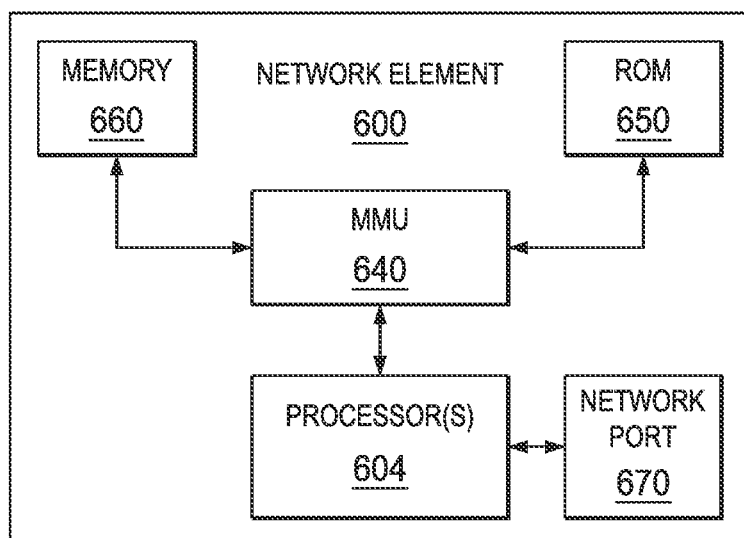
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein. e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Uplink Transmission Cancellation

Figure 7:
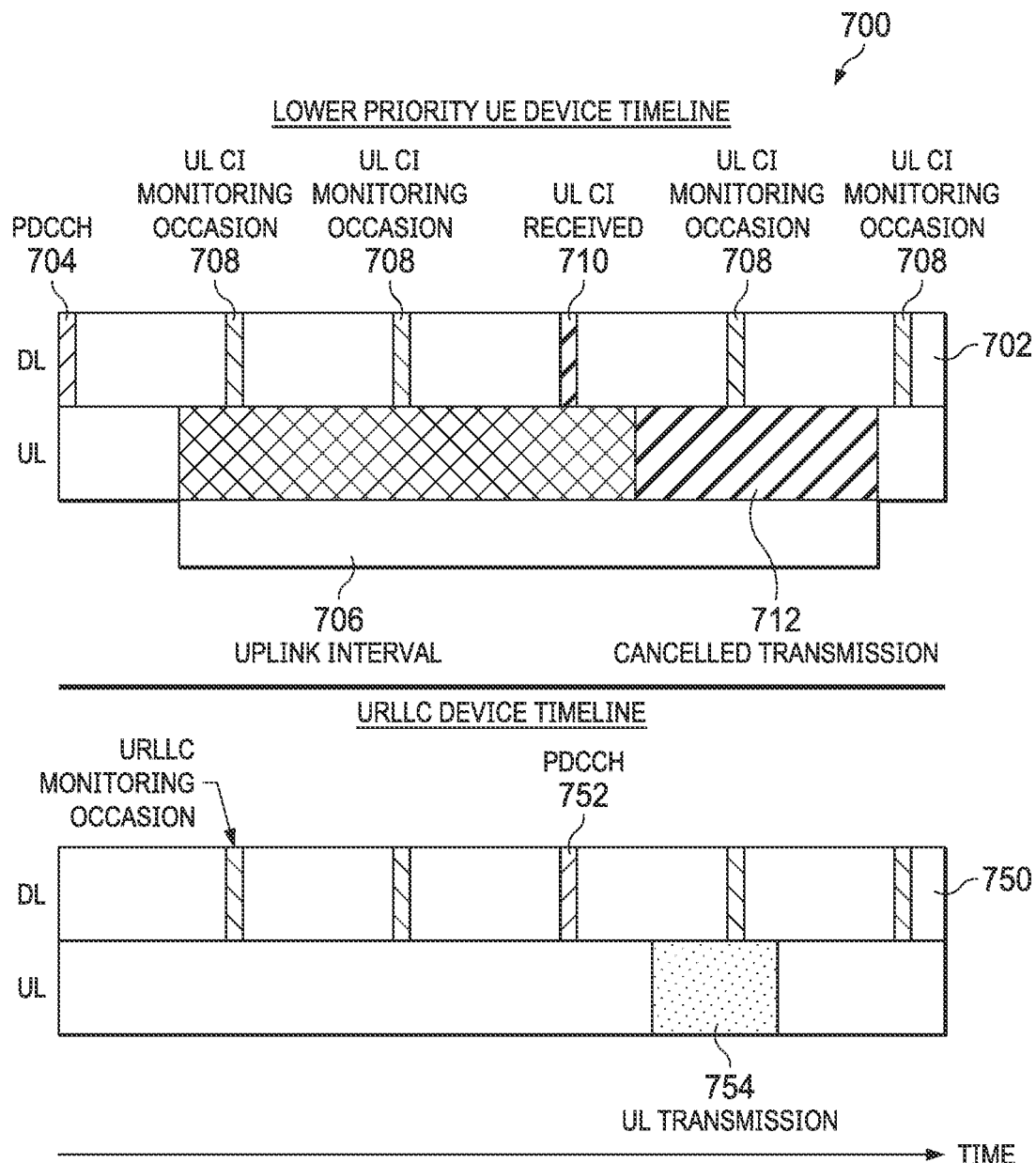
FIG. 7 illustrates an example timing diagram of an uplink cancellation technique, according to some aspects.

FIG. 7 illustrates an example timing diagram 700 of an uplink cancellation technique (also referred to herein as "Inter-UE cancellation" techniques when involving more than a single UE), in accordance with aspects of the present disclosure. The timing diagram 700 includes a timeline for a lower priority UE device 702 and a timeline for a higher priority UE device 750 for a single period of time. As an example, the lower priority UE device 702 may be an Enhanced Mobile Broadband (eMBB) device, massive machine type communication (mMTC) device, etc., and the higher priority UE device 750 may be a URLLC device.

As shown, the lower priority UE device 702 receives a lower priority UE device PDCCH message 704 scheduling an uplink interval 706, during which the lower priority UE device 702 may transmit. In certain cases, the lower priority UE device PDCCH messages 704 may be sent to and provide a transmission and reception schedule for multiple lower priority UE devices. To facilitate cancelling a scheduled uplink of a UE before or during transmission, the UE may listen for an uplink cancellation indication (i.e., a UL CI) during defined UL CI monitoring occasions 708. In certain cases, UL CI may be sent using a new radio network temporary identifier (RNTI), such as a cancellation indication RNTI (CI-RNTI). In some cases, a base station may send the CI to the eMBB UEs on a downlink control channel, such as the Group-Common Physical Downlink Control Channel (GC-PDCCH).

The UL CI message helps allow specific transmissions and/or repetitions to be cancelled individually. Upon receipt of the UL CI 710 during a monitoring occasion, the lower priority UE device 702 may cancel its uplink 712 by stopping its transmission (or cancelling its planned transmission). By stopping the transmission of the lower priority UE device 702, the higher priority UE device 750 may be scheduled, e.g., via a higher priority UE device PDCCH 752, to transmit 754 without interference. By cancelling the uplink from the lower-priority UE device, the higher priority UE device is able to transmit without having to wait for the full uplink interval 706 of the lower priority UE device to pass. In certain cases, the cancelled UE does not automatically resume transmitting, but may be rescheduled at a later time, for example by another lower priority UE device PDCCH message.

In certain cases, the inter-UE uplink cancellation techniques illustrated in FIG. 7 may reuse existing methods for the search space configuration, e.g., slot-level and symbol-level monitoring periodicities are allowed. Radio Resource Control (RRC) configuration of Downlink Control Information (DCI) payload, Aggregation Levels (AL) and/or number of PDDCH candidates is also possible. In some implementations, the maximum monitoring periodicity may be set to a predefined number of slots, e.g., five slots. Such configuration would allow for cross-carrier UL cancellation, as well as cancellation of PUSCH (e.g., Dynamic Grant PUSCH (DG-PUSCH), Configured Grant PUSCH (CG-PUSCH), and/or PUSCH carrying semi-persistent CSI (SP-CSI) reports) and/or a Sounding Reference Signal (SRS). However, in some embodiments, cancellation may not be permitted on PUCCH or RACH (e.g., of Msgs 1/3 or Msg A). For PUSCH with repetitions, UL CI may be applied to each repetition individually (i.e., actual repetition).

Exemplary Reference Regions for UL CI

Figure 8:
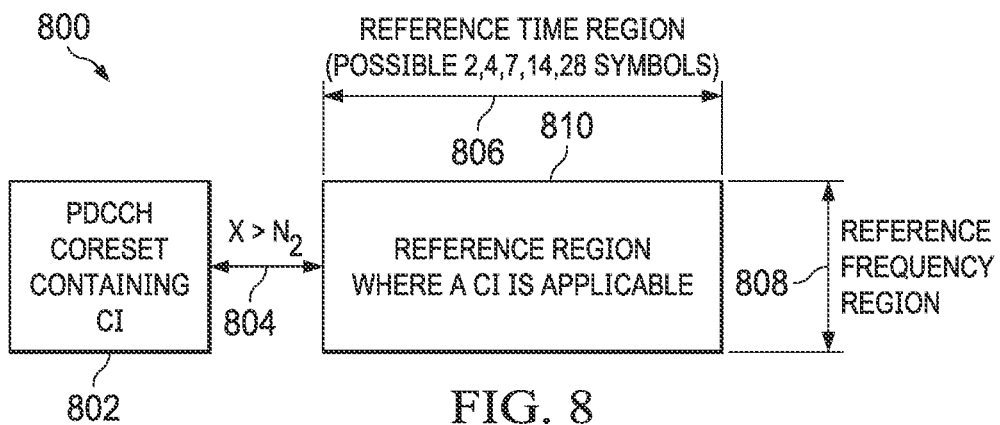
FIG. 8 illustrates an exemplary reference region for Inter-UE UL cancellation indication application, according to some aspects.

Turning now to FIG. 8, an example 800 showing a reference region for Inter-UE UL cancellation indication application is illustrated, according to some aspects. The UL CI defines a reference region within which the UL CI is to be applied 810 in terms of both a reference time region 806 and a reference frequency region 808. In some cases, the reference time region 806 may comprise a predefined number of symbols, e.g., 2, 4, 7, 14, or 28 symbols, etc. As shown at 804, the reference time region for which a UL CI is applicable may start X symbols after the ending symbol of the PDCCH CORESET carrying the UL CI (802), wherein X is at least equal to the minimum processing time for the UL cancellation ($N_2$). A CORESET may comprise a set of physical resources, such as a downlink resource grid, as well as a set of parameters used to carry the PDCCH/Downlink Control Information (DCI).

Figure 9:
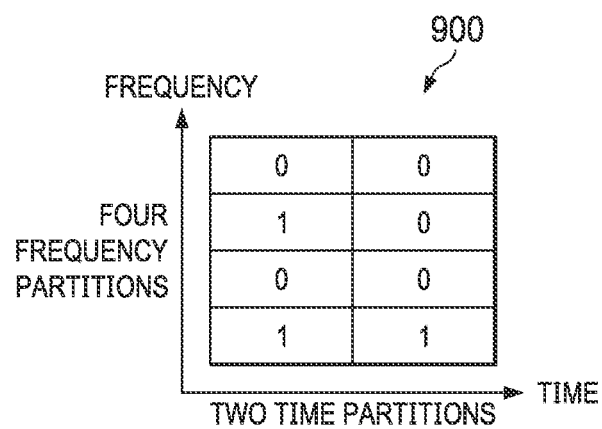
FIG. 9 illustrates an exemplary reference region bitmap structure for Inter-UE UL cancellation indication application, according to some aspects.

FIG. 9 illustrates an exemplary reference region bitmap structure 900 for Inter-UE UL cancellation indication application, according to some aspects. In certain cases, the UL CI may include a 2D bitmap, indicating a time and frequency resource region being cancelled. As illustrated in FIG. 9, the frequency domain has been divided into four frequency partitions, and the time domain has been divided into two time partitions. Thus, the 2D bitmap may comprise 8 individual bits, wherein each bit corresponds to a particular frequency/time resource region. As illustrated in FIG. 9, the presence of '1's may indicate that a particular frequency/time resource region is to be canceled, and the presence of '0's may indicate that a particular frequency/time resource region is not to be canceled.

It is to be understood that the example of FIG. 9 is merely illustrative, and reference regions may take on any desired size or shape, in both the frequency and time domains, as is needed for a given implementation, e.g., Y bits may be used for bitmap indication of a reference region with M partitions in time and N partitions in frequency, wherein Y=M×N. According to some embodiments, partitioning of the reference region is done after excluding DL symbols indicated by gNB configuration and SSB symbols. The values of M (i.e., timegranularityforCI) and N (i.e., frequencygranularityforCI) may be obtained from the following values from the RRC configuration: CI-PayloadSize (1, . . . , 112), timegranularityforCI (1 . . . , 28), timedurationforCI, frequencyRegionforCI. The value of frequencygranularityforCI may then be derived from the above values. The value of timedurationCI may be related to the UL CI monitoring periodicity, i.e., it may be at least the same, if 1 slot is used with 1 monitoring occasion, frequencyRegionforCI may be used to indicate the reference frequency region for cancellation with an offset and a length (e.g., as indicated by an R1V).

The number of frequency partitions may also be determined by the CI payload size and the number of time partitions, e.g., if the CI payload size given by ci-PayloadSize-r16 is 8, and the number of time partitions given by timeGranularityForCI-r16 is 2, then the number of frequency partitions is 8/2, or 4. For each time partition, there may be a 1-D cancellation bitmap, wherein each bit corresponds to a particular frequency partition.

Additional examples of reference regions and schemes to be used for interlaced UL CI will be discussed in further detail below, with reference to FIGS. 10-13.

Interlaced Resource Allocation Schemes for UL CI

Figure 10:
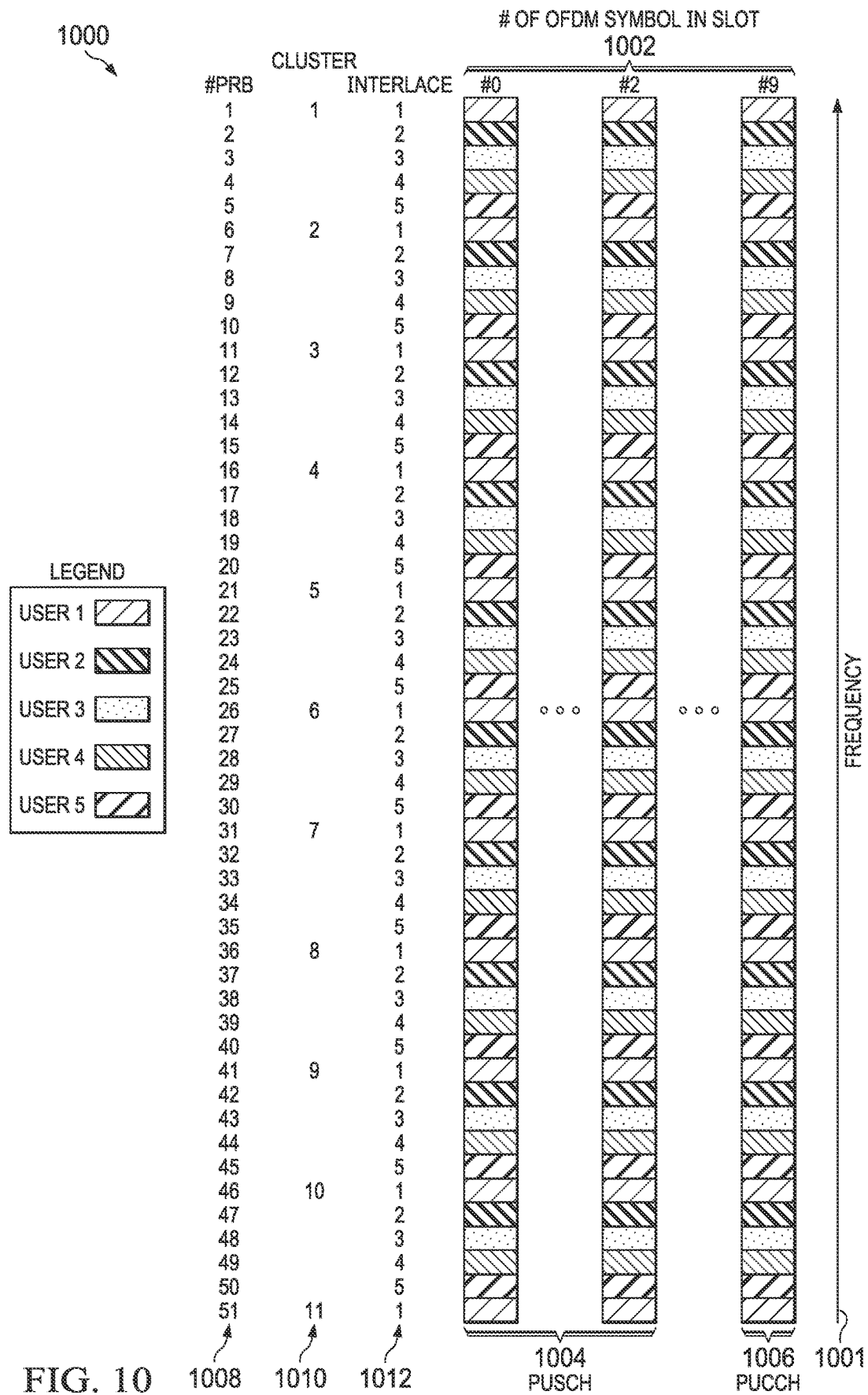
FIG. 10 illustrates an exemplary interlaced resource allocation scheme for PUSCH and PUCCH, according to some aspects.

FIG. 10 illustrates an exemplary interlaced resource allocation scheme 1000 for PUSCH (1004) and PUCCH (1006), according to some aspects. Scheme 1000 illustrates an exemplary interlacing pattern for a system with 30 kHz subcarrier spacing (SCS), although, as will be explained further below, other SCSs are also possible. In scheme 1000, there are M=5 interlaces (1012), represented by the 5 alternating shading patterns of the physical resource blocks (PRBs) in each utilized OFDM symbol of the illustrated slot (1002). It is to be understood that the usage of Symbols #0, 2, 9 in the example of scheme 1000 is merely for illustrative purposes.

As shown in the Legend of FIG. 10, each of the M=5 interlaces may apply to a particular User or UE (e.g., User 1 may be assigned Interlace 1, transmitted at PRBs #1, 6, 11, and so forth; while User 2 may be assigned Interlace 2, transmitted at PRBs #2, 7, 12, and so forth). As illustrated in scheme 1000, there are 51 exemplary PRBs (1008) shown stacked upon one another in the frequency domain (1001), divided evenly into 10 repeating clusters (1010), with N=10 PRBs total assigned to each interlace (i.e., M=5 interlaces*N=10 clusters=a utilized bandwidth of 50 PRBs), plus one additional PRB to show where the eleventh cluster would begin. As illustrated in FIG. 10, depending on the system bandwidth available and the number, N, of PRBs used per interlace, the total number of PRBs utilized could continue on to utilize 51 or more PRBs.

Figure 11:
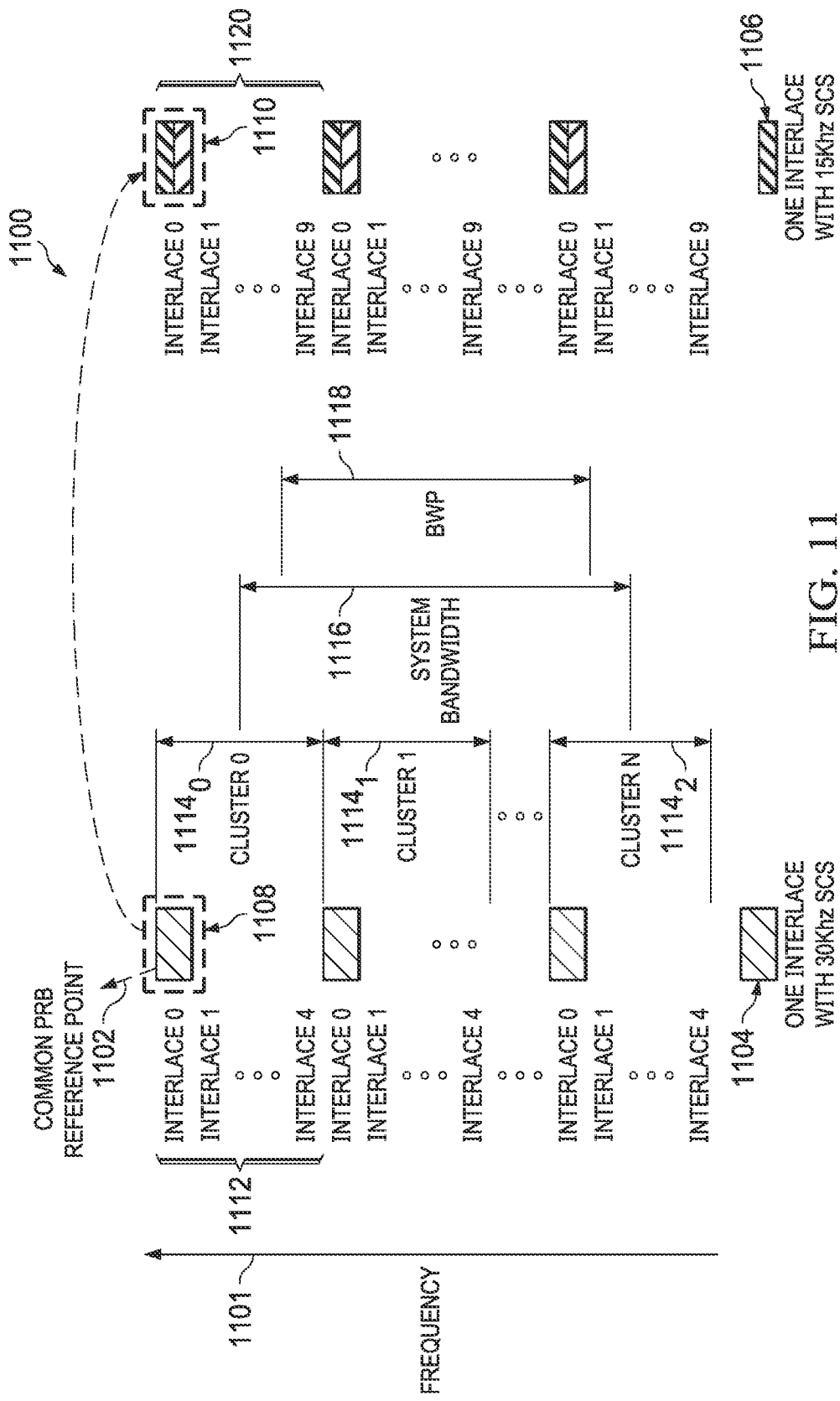
FIG. 11 illustrates an exemplary nested interlaced resource allocation scheme, according to some aspects.

FIG. 11 illustrates an exemplary nested interlaced resource allocation scheme 1100, according to some aspects. According to some aspects, it may be desirable to support a common interlace design for PUSCH and PUCCH, regardless of carrier bandwidth and/or SCS. In the example illustrated in FIG. 11, the carrier on the left of FIG. 11 utilizes interlaces with 30 kHz SCS (1104), while the carrier on the right of FIG. 11 utilizes interlaces with 15 kHz SCS (1106).

As shown at 1102, the two carriers may advantageously use a common PRB reference point (1102) (also referred to in NR as "Point A"), e.g., so that the "nested" structure may be employed to achieve efficient multiplexing of users, regardless of SCS. For example, the same spacing between consecutive PRBs in an interlace in the frequency domain (1101) could be employed, regardless of carrier system bandwidth 1116 or the bandwidth part (BWP) of a UE 1118, i.e., a part of the system's bandwidth made up of a subset of contiguous common PRBs assigned to a UE.

Meanwhile, the number of PRBs used per interlace could be dependent on carrier bandwidth. As shown in the example of FIG. 11, the same amount of carrier bandwidth may be able to support 5 interlaces (i.e., Interlace 0 through Interlace 4) with 30 kHz SCS (1112), while being able to support 10 interlaces (i.e., Interlace 0 through Interlace 9) with 15 kHz SCS (1120). As shown in 'split' PRB 1110, this may be achievable by essentially splitting each 30 kHz PRB (e.g., 1108) into two equally-sized 15 kHz interlaces in the 15 kHZ SCS example. As discussed above, a cluster 1114 of interlaces may comprise a repeating set of each of the defined interlaces in the scheme (e.g., cluster 0=$\mathbf{1114_0}$, cluster 1=$\mathbf{1114_1}$, cluster 2=$\mathbf{1114_2}$, etc.). In the nested example of FIG. 11, the clusters in both the 30 kHZ SCS example (e.g., 1112) and the 15 kHz example (e.g., 1120) would advantageously take up the same amount of system bandwidth (i.e., 5*30 kHZ=150 kHz, in the 30 kHz SCS example, and also 10*15 kHz=150 kHz, in the 15 kHz SCS example).

Further details regarding UL resource allocation and, in particular, UL resource allocation type 2 for PUSCH may be found in TS 38.214, e.g., at Section 6.1.2.2.3, wherein it is explained that the allocated interlace indices may be given by RIV, which provides either the starting interlace index and the number of contiguous interlace indices, or provides the interlace indices according to the Table 6.1.2.3.3-1 in TS 38.214. The allocated PRBs may then be given by $RIV_{set}$, which provides the starting PRB set and the number of contiguous PRB sets.

Figure 12:
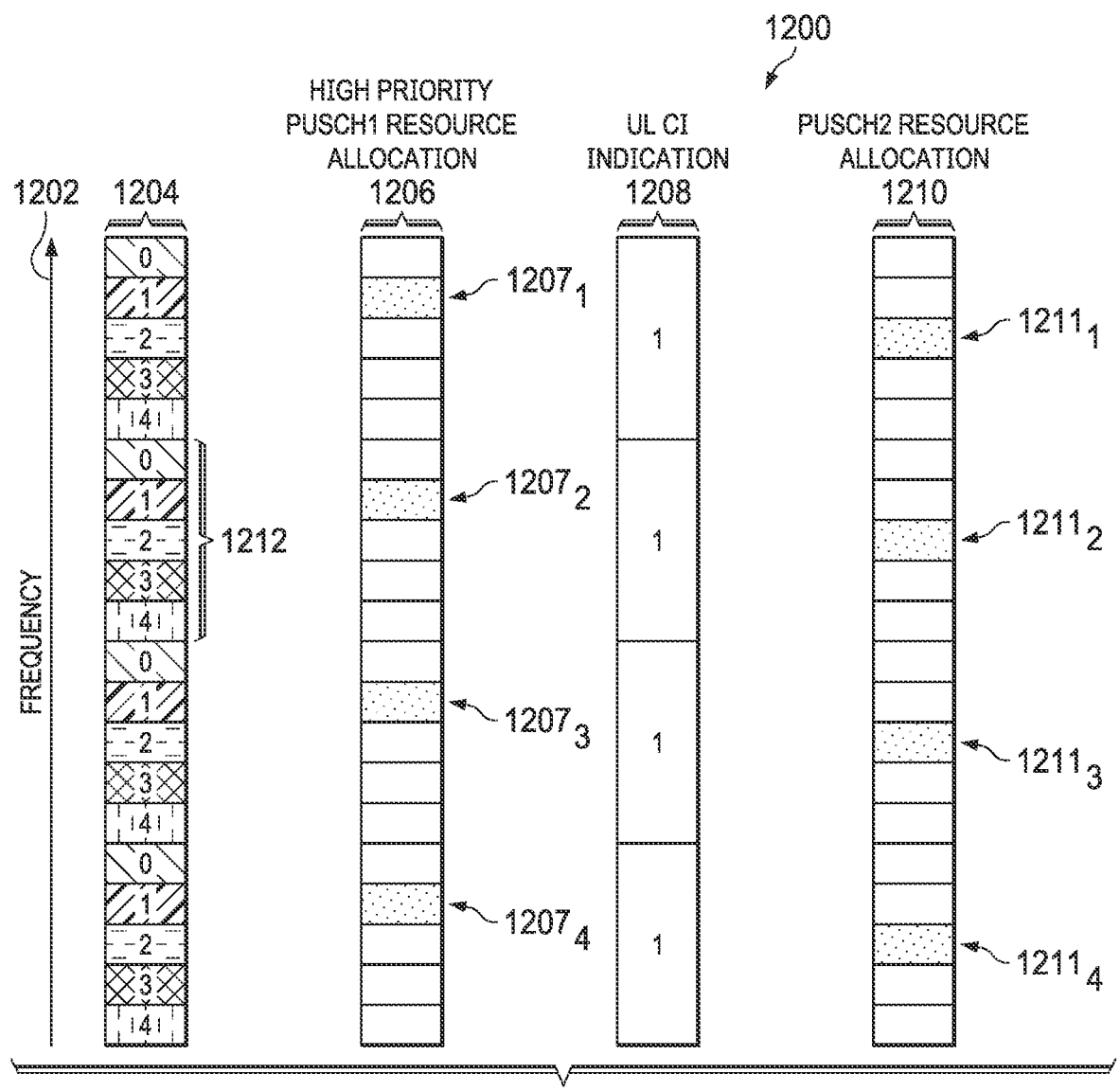
FIG. 12 illustrates an exemplary interlaced resource allocation scheme for multiple PUSCHs, according to some aspects.

FIG. 12 illustrates an exemplary interlaced resource allocation scheme 1200 for multiple PUSCHs, according to some aspects. As mentioned above, a new type of frequency resource allocation with interlaced structure has been introduced in NR-U. However, inter-UE uplink cancellation indication is defined in Rel-16 without taking into account the interlaced allocation, which may lead to inefficiencies when indicating the resources for cancellation when the interlaced resource allocation is used. For example, in the scheme 1200 illustrated in FIG. 12, there are again repeating clusters of 5 interlaces (1212) in the frequency domain (1202) for a given OFDM symbol 1204 (i.e., Interlace 0, Interlace 1, Interlace 2, Interlace 3, and Interlace 4, repeating).

Assuming that a 'high priority' transmission (e.g., from a URLLC device) needed to be allocated certain resources on a shared uplink channel "PUSCH1" (1206) that are currently assigned to interlace 1, as indicated by the shaded PRBs $\mathbf{1207_1/1207_2/1207_3/1207_4}$, then, according to prior art UL cancellation schemes (e.g., as defined in Rel-16), such as the exemplary scheme illustrated in FIG. 12 with 4 partitions in frequency domain, the UL CI indication (1208) would have to indicate a cancellation (i.e., a value of '1' in a UL CI bitmap) in each of the frequency partitions, because there is one PRB in each of the partitions being used by the 'high priority' transmission (i.e., the aforementioned shaded PRBs $\mathbf{1207_1/1207_2/1207_3/1207_4}$). In effect, this would cause the uplink cancellation of all 5 interlaces-even though it was only interlace 1 that needed to be canceled in this example, thus resulting in inefficiency and unnecessary underutilization of resources due to the unnecessary cancellation. In particular, assuming there was another PUSCH, "PUSCH2" (1210), having a resource allocation assigned to interlace 2, as indicated by the shaded PRBs $\mathbf{1211_1/1211_2/1211_3/1211_4}$, then, according to prior art UL cancellation schemes, the UL CI indication (1208) would also unnecessarily cancel the entire PUSCH2. In other words, current UL CI indication schemes do not provide the mechanism to account for the targeted cancellation of individual interlaced resource allocations. Thus, exemplary techniques to provide such cancellation indication that are able to account for interlaced resource allocation schemes are described further, hereinbelow.

Exemplary Interlaced Frequency Resource Allocation Cancellation Indication Schemes According to some aspects, for the frequency domain in the uplink cancellation indication, instead of having each bit in the UL CI (e.g., in the case of a UL CI indicate using a bitmap or bitmask) indicating a contiguous set of PRBs, the indicator may be defined to indicate one or more interlaces—as well as the PRBs within each of the indicated interlaces—for cancellation. Various options for indicating the interlaces for cancellation are possible within the scope of the teachings of this disclosure, three of which will now be described in greater detail.

Interlace indication Option 1: One or more interlaces indices (e.g., indices in the range of 0 to 9) may be indicated directly. A special case is that a single interlace index may be indicated. This has smaller overhead, but it also has the limitation of only being able to indicate one interlace. The number of interlace indices may either be pre-defined or semi-statically configured or dynamically indicated. However, this may have a larger overhead, depending on how many interlace indices are indicated.

Interlace indication Option 2: The RIV definition in TS 38.214 Section 6.1.2.2.3 may be reused to indicate one or more consecutive interlace(s). Optionally. Table 6.1.2.2.3-1 in TS 38.214 can be used to define some combinations of non-consecutive interlaces for cancellation. This option may have the limitation that it can only indicate consecutive interlaces in most cases (i.e., except for the cases defined in Table 6.1.2.2.3-1). It may be suitable for cases wherein the UL CI is used to indicate for a single preempting PUSCH transmission, but it may not be as efficient when there are multiple preempting PUSCH transmissions.

Interlace indication Option 3: The interlaces to be canceled may be indicated by a bitmap, e.g., with each bit in the bitmap corresponding to one or more interlaces. A special case is that the bitmap length is the same as the total number of interlaces, whereby each bit in the bitmap may correspond to one interlace. This provides the most flexibility, but the overhead may be large (e.g., see uplink resource allocation Type 2 with 30 kHz SCS). The number of interlaces each bit corresponds to can be either pre-defined or semi-statically configured or dynamically indicated. For example, for carriers using 15 kHz SCS with 10 interlaces, a 5-bit bitmap may be defined, wherein the first bit corresponds to the 1st and 2nd interlaces, the second bit corresponds to the 3rd and 4th interlaces, and so forth. Alternatively, the number of bits in the bitmap may be defined or signaled directly.

As described above, each interlace may be comprised of 2 or more PRBs, each of which may or may not need to be canceled. As such, it may be desirable to provide an indication of which PRBs, within a given interlace, should be canceled at a given time. Various options for indicating the PRBs within an interlace for cancellation are possible within the scope of the teachings of this disclosure, three of which will now be described in greater detail.

PRB indication Option A: The PRBs for cancellation may be indicated by a bitmap. e.g., with one bit corresponding to a set of one or more PRBs. This is similar to how UL CI is defined in Rel-16, except that, according to PRB indication Option A, bitmap value may correspond to only the PRBs within one interlace, i.e., rather than simply referring to consecutive PRBs in frequency. If the frequency domain granularity is configurable (e.g., the bitmap length is configurable), it provides the flexibility for the gNB to determine the granularity, while considering the tradeoff between increased UL CI overhead and greater granularity in the indication of the resources to be cancelled.

PRB indication Option B: The PRBs for cancellation may be indicated by the starting PRB index number and the number of PRBs separately. For the indication under Option B, the PRBs can be indexed considering only the PRBs within an interlace. However, as explained below, Option B may have a larger overhead than Option C.

PRB indication Option C: The PRBs for cancellation may be indicated by the starting PRB and the number of PRBs using $RIV_{RBset}$, e.g., in the same way that it is defined in uplink resource allocation type 2 in TS 38.214 Section 6.1.2.2.3. For the indication under Option C, the PRBs can be indexed considering only the PRBs within an interlace.

It is to be understood that the various Options described above for interlace and PRB indication may be used in different cases and/or scenarios (e.g., with different Options being used for different SCS configurations), and may be combined in any possible way. For example, Interlace indication Options 2/3 combined with PRB indication Option C would effectively reuse the mechanism of uplink resource allocation type 2. In other words, such a combination would be able to signal the exact resources for cancellation in the case when the UL CI is used to indicate for a single preempting PUSCH transmission. However, it may need to include unnecessary resources for cancellation if there are more than one preempting PUSCH transmissions. As another example, Interlace indication Option 3 combined with PRB indication Option A could provide good flexibility in terms of a tradeoff between DCI overhead and resource granularity, assuming the granularity is configurable.

It is possible for the standard to define which Options are used (including different combinations of Options for different scenarios and use cases). It is also possible for the choice of Options to be configured by higher layers in the network.

The SCS configuration for the frequency resource indication can be either: the DL SCS where the UE monitors the UL CI, the UL SCS of the UE; or a reference SCS (e.g., that is semi-statically configured, or pre-defined based on the broadcast/unicast signaling). It may also be semi-statically configured as to whether the CI is based on the interlaced frequency resource structure or follows the existing Rel-16 definition. Alternatively, it can be dynamically indicated in the CI message itself, e.g., by adding an additional field in the CI message.

As alluded to above, the PRB indication may be applicable to one or more interlaces that are indicated in the interlace indication. For example, the PRB indication can be common for all the indicated interlaces. This gives the smallest overhead. As another example, the PRB indication can be separately indicated for each indicated interlace. This would result in larger overhead but provide for finer granularity in the indication of resources to be canceled.

As another example, each PRB indication can be applicable to a group of interlaces. The grouping can be done either based on all the interlaces, or based on the indicated interlaces only. The number of groups or the number of interlaces in a group can be configurable. In a first example, if there are a total of 10 interlaces, the interlaces may be divided into 5 groups, with 2 interlaces in each group. Each PRB indication may then be applicable to one group (i.e., to a set of 2 interlaces). This could be suitable for use, e.g., if the preempting PUSCH transmission is typically scheduled with a 2-symbol interval. In a second example, assuming the number of groups is configured to be 4, the indicated interlaces may be divided into 4 groups (e.g., as equally as possible), and then each PRB indication may be applicable to one of the groups.

Figure 13A:
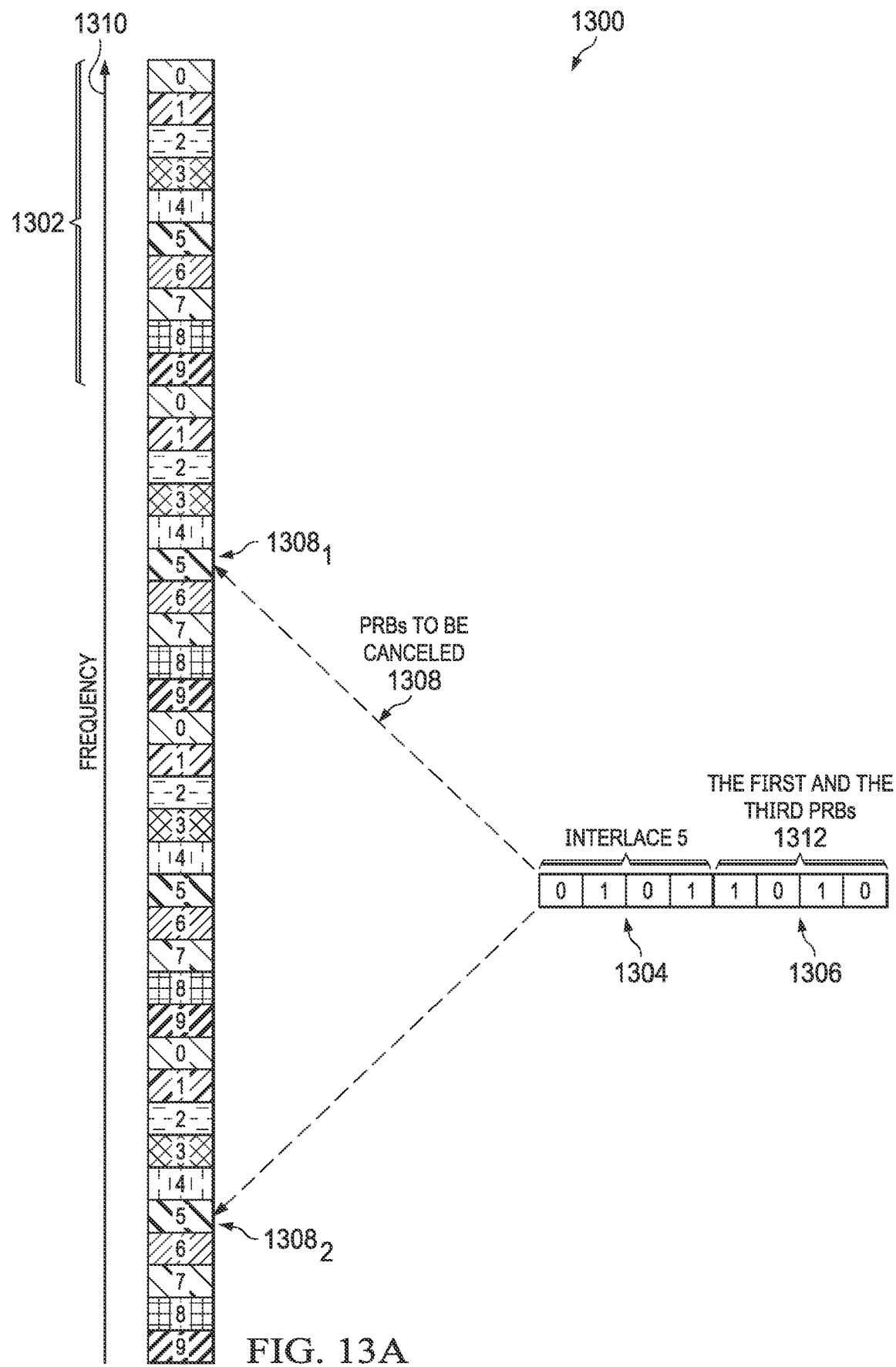
FIGS. 13A-13C illustrate exemplary interlaced frequency resource allocation cancellation indication schemes, according to some aspects.

Turning now to FIG. 13A, an exemplary interlaced frequency resource allocation cancellation indication scheme 1300 is illustrated, according to some aspects. Scheme 1300 reflects an exemplary implementation of Interlace indication Option 1 combined with PRB indication Option A (as defined above), wherein there are clusters of 10 PRBs (1302) repeated in the frequency domain 1310. In the example illustrated in FIG. 13A, a single interlace index (i.e., interlace 5) is indicated with bits 1304, while the PRB cancellation indication uses a bitmap 1306, with each bit in bitmap 1306 corresponding to each PRB. In this example, each interlace is spread across 4 different PRBs, thus a 4-bit bitmap may be used to indicate which PRB(s) in an interlace should be cancelled. In this case, the first and third PRBs of interlace 5 are to be canceled, as indicated at 1312. Beginning at the bottom of the frequency domain 1310, the first PRB assigned to the fifth interlace, which is to be canceled, is represented by PRB $1308_2$, while the third PRB assigned to the fifth interlace, which is also to be canceled, is represented by PRB $1308_1$. As may now be understood, the bits in bitmaps 1304 and 1306 jointly specify the cancellation of only a certain subset of PRBs 1308 (in this case $1308_1$ and $1308_2$), while all other PRBs may continue to be used for uplink transmission (e.g., by eMBBs), which provides the gNB with greater granularity, and avoids unnecessarily cancelling uplink resources for other UEs.

Figure 13B:
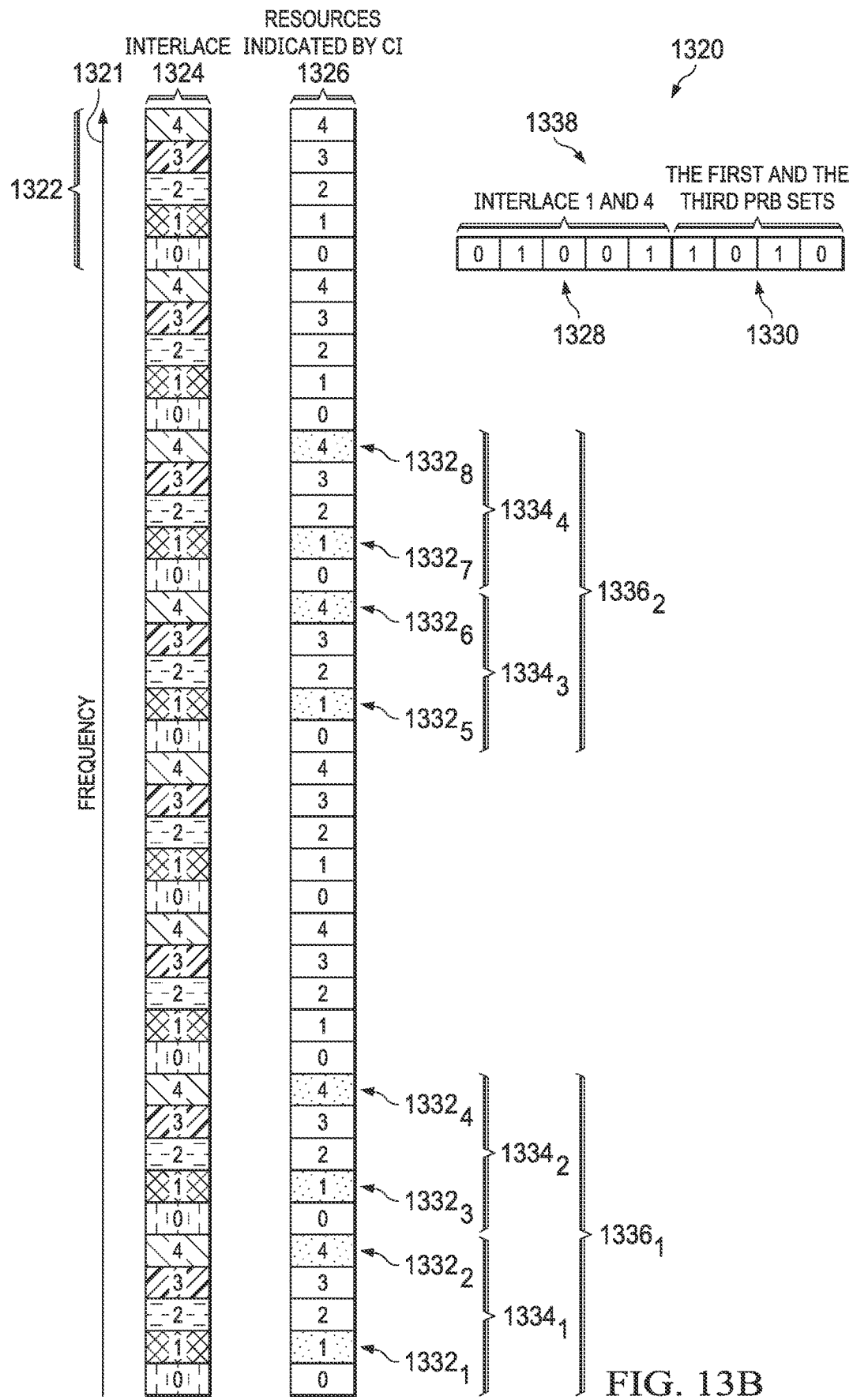

FIG. 13B illustrates another exemplary interlaced frequency resource allocation cancellation indication scheme 1320, according to some aspects. Scheme 1320 reflects an exemplary implementation of Interlace indication Option 3 combined with PRB indication Option A (as defined above). In the example illustrated in FIG. 13B, the interlaces for cancellation are indicated with a 5-bit bitmap (1328), with one bit corresponding to each interlace (i.e., interlaces 1 and 4 are to be canceled in the example of FIG. 13B, as shown at 1338). Meanwhile, the PRBs to be canceled are indicated with a 4-bit bitmap (1330).

In this example, each interlace (1324) has 8 PRBs (i.e., there are 8 clusters (1322) repeated across the frequency domain 1321, each including a PRB for each of interlace 0 through interlace 4), so each of the 4 bits in the bitmask 1330 is used to correspond to a 2-PRB set (i.e., so that all 8 PRBs per interlace might be addressed). In this example, the first bit of bitmask 1330 being set to '1' means the 2 PRBs in the first PRB set (i.e., the first two PRBs, counting up from the bottom of FIG. 13B, within a given interlace) are to be canceled. In other words, this bit corresponds to $1332_1$ and $1332_3$ for interlace 1, and $1332_2$ and $1332_4$ for interlace 4. The third bit of bitmask 1330 being set to '1' means the 2 PRBs in the third PRB set (i.e., the fifth and sixth PRBs, counting up from the bottom of FIG. 13B, within a given interlace) are to be canceled. In other words, this bit corresponds to $1332_5$ and $1332_7$ for interlace 1, and $1332_6$ and $1332_8$ for interlace 4. In this example, the same PRB indication applies to all the interlaces indicated (in other words, to both interlace 1 and interlace 4).

Thus, the final PRBs indicated by the CI for cancellation in the example of FIG. 13B (i.e., represented by shaded boxes $1332_1$-$1332_8$ in column 1326) comprise: the first and fourth interlaces (i.e., $1332_1/1332_3$ and $1332_2/1332_4$) of the first and second clusters (i.e., $1334_1$ and $1334_2$), labeled jointly as cluster set $1336_1$, as well as the first and fourth interlaces (i.e., $1332_5/1332_7$ and $1332_6/1332_s$) of the fifth and sixth clusters (i.e., $1334_3$ and $1334_4$), labeled jointly as cluster set $1336_2$.

Figure 13C:
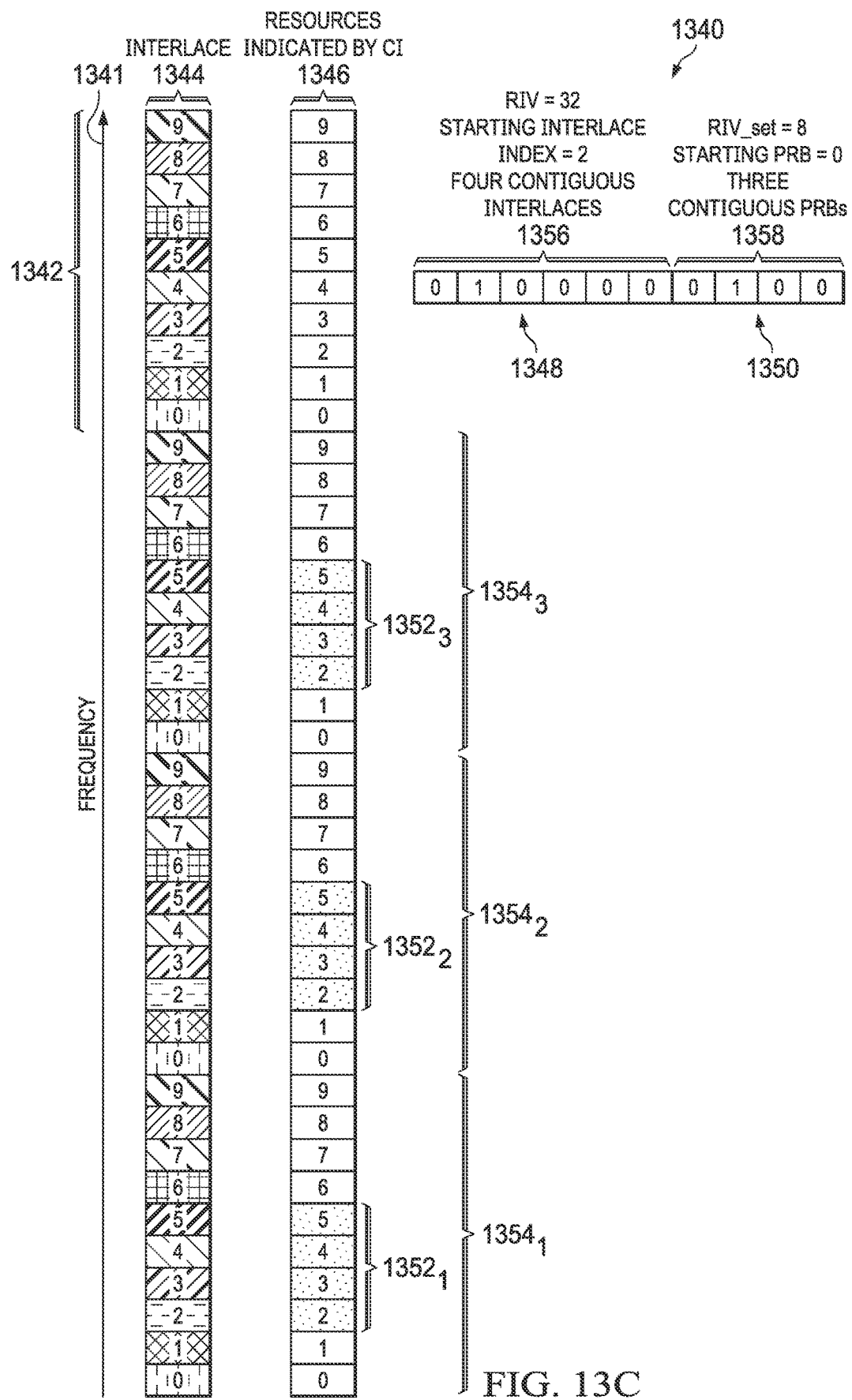

FIG. 13C illustrates yet another exemplary interlaced frequency resource allocation cancellation indication scheme 1340, according to some aspects. Scheme 1340 reflects an exemplary implementation of Interlace indication Option 2 combined with PRB indication Option C (as defined above). In other words, the interlaces (1344) for cancelation in the frequency domain (1341) are indicated with a RIV value (1348), which translates into the starting interlace index and the number of contiguous interlaces. In the example of FIG. 13C, an RIV value of 32 is indicated (1356). With a total of 10 interlaces per cluster (1342), it means that the starting interlace index is 2, and the number of allocated contiguous interlaces is 4, according to TS 38.214 at Section 6.1.2.2.3. In other words, interlaces having indices #2, #3, #4, and #5 are to be canceled.

The PRBs for cancelation are indicated with a $RIV_{9a}$ value (1350), which translates into the starting PRB (set) and the number of contiguous PRB sets. In the example of FIG. 13C, for each interlace, there are 4 PRB sets, with a single PRB in each PRB set. Thus, because an $RIV_{set}$ value of 8 has been indicated (1358), it translates to a starting PRB index of 0, and a number of contiguous PRBs of 3, again, according to TS 38.214 at Section 6.1.2.2.3. In other words, each of PRBs #0, #1, and #2 are to be canceled for each of interlaces #2, #3, #4, and #5.

Thus, the final PRBs indicated by the CI for cancellation in the example of FIG. 13C (i.e., represented by shaded boxes $1352_1$-$1352_3$ in column 1346) comprise: the second through fifth interlaces (i.e., 1352) of each of the first, second, and third clusters (i.e., $1354_1$, $1354_2$, and $1354_3$).

Figure 14:
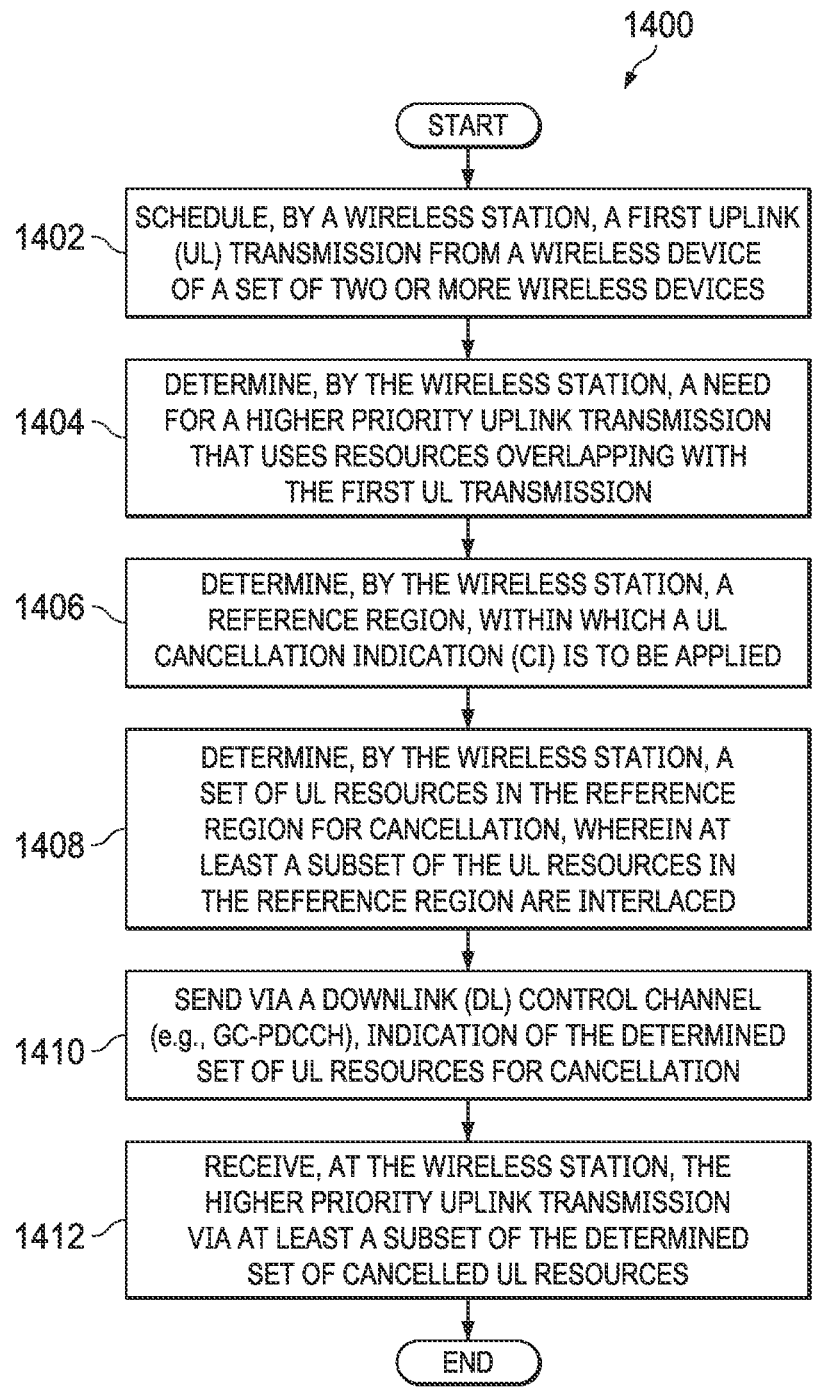
FIG. 14 is a flowchart illustrating an exemplary process for a wireless station of determining and sending an uplink cancellation indication for interlaced frequency resources, according to some aspects.

Exemplary Methods for Performing Interlaced Frequency Resource Allocation Cancellation Indication FIG. 14 is a flowchart illustrating an exemplary process 1400 for a wireless station of determining and sending an uplink cancellation indication for interlaced frequency resources, according to some aspects. First, at Step 1402, the process 1400 may schedule, by a wireless station, a first uplink (UL) transmission from a wireless device of a set of two or more wireless devices. Next, at Step 1404, the process 1400 may determine, by the wireless station, a need for a higher priority uplink transmission that uses resources overlapping with the first UL transmission. Next, at Step 1406, the process 1400 may determine, by the wireless station, a reference region, within which a UL cancellation indication is to be applied. Next, at Step 1408, the process 1400 may determine, by the wireless station, a set of UL resources in the reference region for cancellation, wherein at least a subset of the UL resources in the reference region are interlaced (e.g., as illustrated in the various schemes described above). Next, at Step 1410, the process 1400 may send via a downlink control channel (e.g., GC-PDCCH), an indication of the determined set of UL resources for cancellation. Finally, at Step 1412, the process 1400 may receive, at the wireless station, the higher priority uplink transmission via at least a subset of the determined set of cancelled UL resources.

Figure 15:
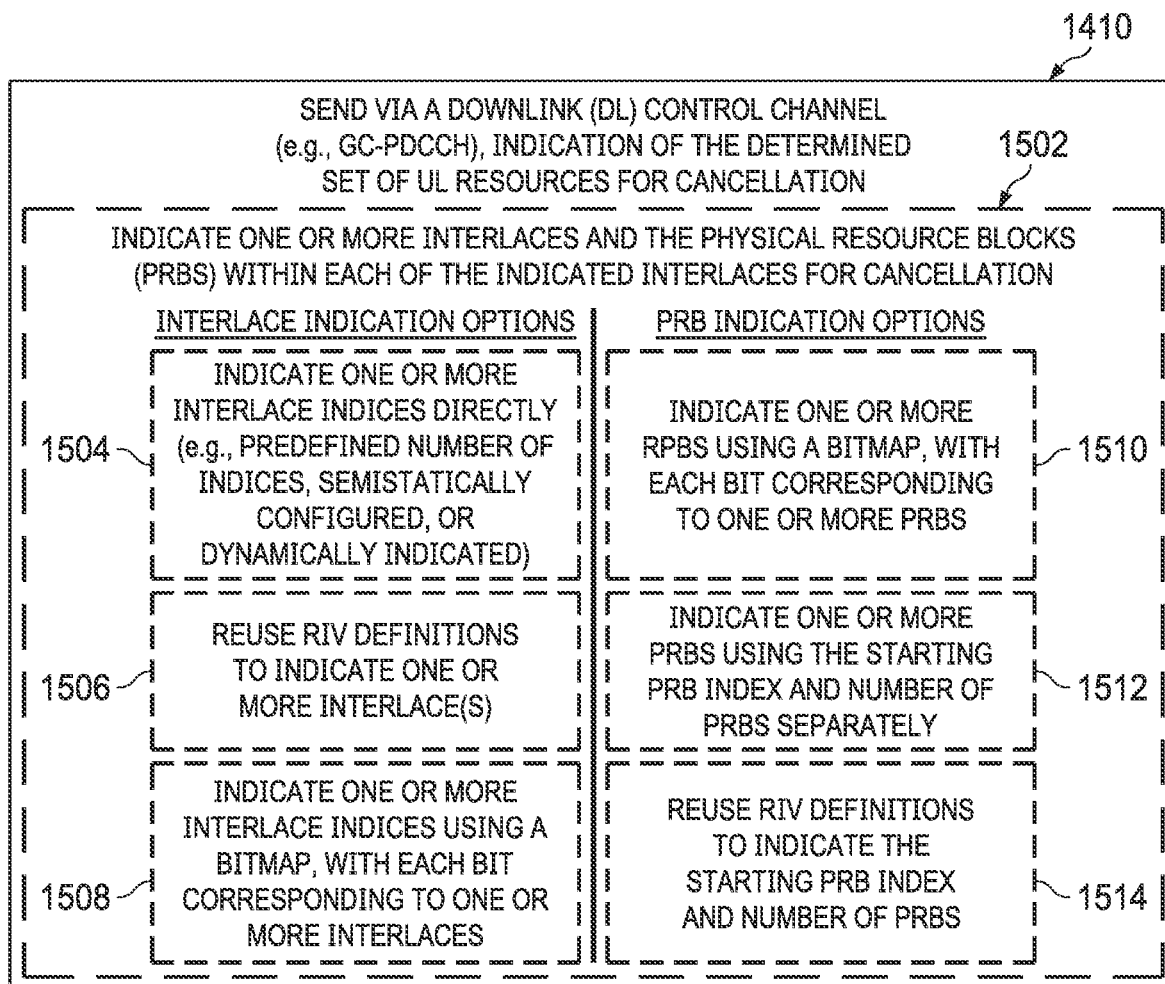
FIG. 15 is a flowchart illustrating exemplary options for indicating interlaces and/or physical resource blocks for cancellation, according to some aspects.

FIG. 15 is a flowchart illustrating exemplary options 1502 for indicating interlaces and/or physical resource blocks for cancellation, according to some aspects. Options 1502 comprise various ways of indicating the determined set of UL resources for cancellation, e.g., as referred to in Step 1410 of FIG. 14. According to some embodiments, a first set of options may exist for indicating the interlace indices of the UL resources that are to be canceled. For example, the first set of options may comprise: indicating one or more interlace indices directly (e.g., a predefined number of indices, semi-statically configured, or dynamically indicated) (block 1504); reusing resource indicator value (RIV) definitions to indicate one or more interlace(s) (e.g., consecutive interlaces) (block 1506); or indicating one or more interlace indices using a bitmap, with each bit corresponding to one or more interlaces (block 1508).

According to other embodiments, a second set of options may exist for indicating the particular physical resource blocks (PRBs) within the indicated interlaces that are to be canceled. For example, the second set of options may comprise: indicating one or more PRBs using a bitmap, with each bit corresponding to one or more PRBs (block 1510); indicating one or more PRBs using the starting PRB index and number of PRBs separately (block 1512); or reusing RIV definitions to indicate the starting PRB index and number of PRBs (block 1514).

Figure 16:
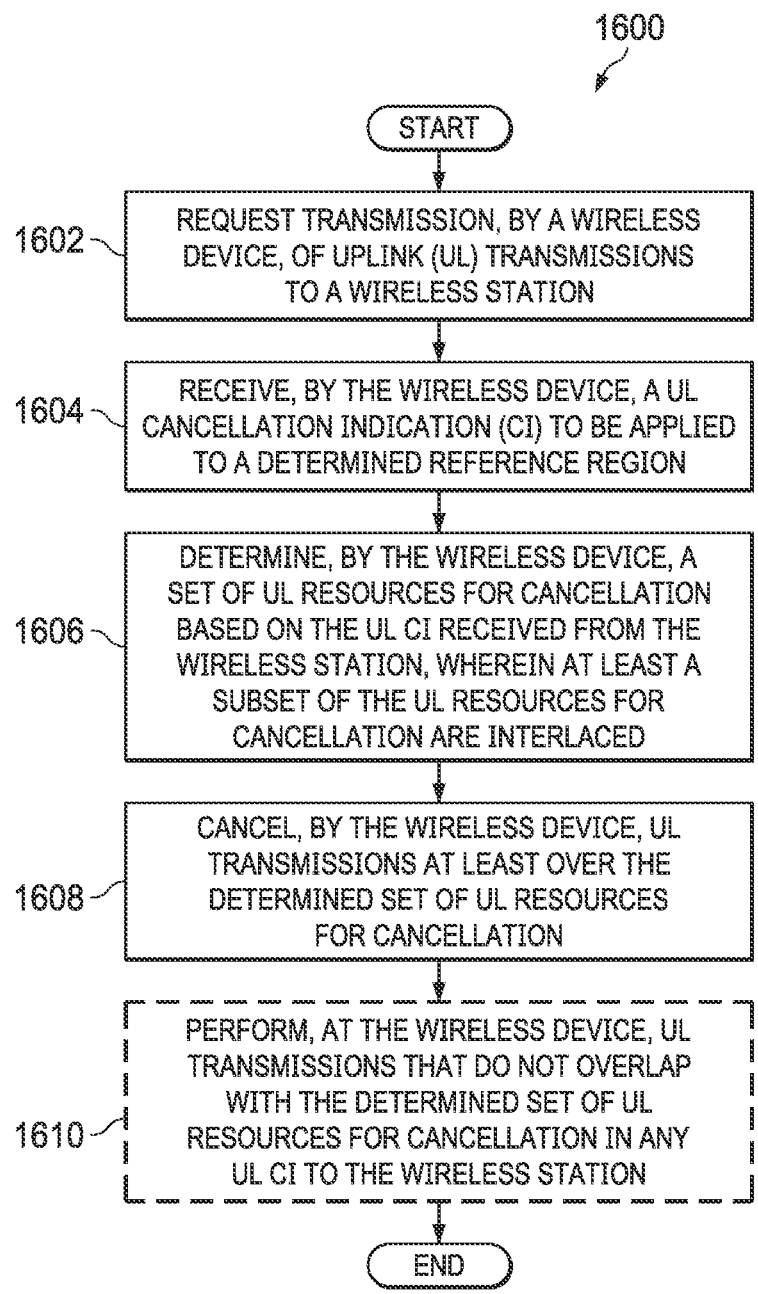
FIG. 16 is a flowchart illustrating an exemplary process for a wireless device of determining, based on a received uplink cancellation indication, a set of interlaced UL resources for cancellation, according to some aspects.

FIG. 16 is a flowchart illustrating an exemplary process 1600 for a wireless device of determining, based on a received uplink cancellation indication, a set of interlaced UL resources for cancellation, according to some aspects. First, at Step 1602, a wireless device may request to transmit uplink transmissions to a wireless station. Next, at Step 1604, the process 1600 may receive, by the wireless device, a UL cancellation indication to be applied to a determined reference region. Next, at Step 1606, the process 1600 may determine, by the wireless device, a set of UL resources for cancellation based on the UL CI received from the wireless station, wherein at least a subset of the UL resources for cancellation are interlaced. Next, at Step 1608, the process 1600 may cancel, by the wireless device, at least the UL transmissions that overlap with the determined set of UL resources for cancellation. It is to be understood that, in some embodiments, the UE may also cancel additional UL transmissions to those that overlap with the determined set of UL resources for cancellation. For example, the actual cancellation may also cancel any uploads that comes after the determined set of UL resources for cancellation. In some embodiments, a UE may also cancel resources that are earlier in time than the determined set of UL resources for cancellation. In still other embodiments, with respect to the frequency domain, a given UE may actually cancel all its uploads, i.e., over the entire frequency bandwidth, not just the PRBs overlapping with the would cancel everything, not just the overlapping PRBs overlapping with the determined set of UL resources for cancellation. Finally, at Step 1610, if desired, the process 1600 may perform, at the wireless device, UL transmissions that do not overlap with the determined set of UL resources for cancellation in any UL CI to the wireless station.

EXAMPLES

In the following sections, further examples are provided. According to example 1, a method for communication in a wireless system is disclosed, comprising: scheduling, by a wireless station, a first uplink (UL) transmission from a wireless device of a set of two or more wireless devices; determining, by the wireless station, a need for a higher priority uplink transmission that uses overlapping with the first UL transmission; determining, by the wireless station, a reference region, within which a UL cancellation indication (CI) is to be applied; determining, by the wireless station, a set of UL resources in the reference region for cancellation, wherein at least a subset of the UL resources in the reference region are interlaced; sending, via a downlink (DL) control channel, indication of the determined set of UL resources for cancellation; and receiving, at the wireless station, the higher priority uplink transmission via at least a subset of the determined set of cancelled UL resources.

Example 2 comprises the subject matter of example 1, wherein the higher priority uplink transmission comprises a transmission from an Internet of Things (IoT) or Ultra-reliable low latency communication (URLLC) device.

Example 3 comprises the subject matter of example 1, wherein the determined set of UL resources in the reference region for cancellation comprise UL resources in an unlicensed band of frequency spectrum.

Example 4 comprises the subject matter of example 1, wherein the DL control channel comprises a Group-Common Physical Downlink Control Channel (GC-PDCCH).

Example 5 comprises the subject matter of example 1, wherein sending, via a DL control channel, indication of the determined set of UL resources for cancellation further comprises: indicating one or more interlaces and Physical Resource Blocks (PRBs) within each of the indicated one or more interlaces for cancellation.

Example 6 comprises the subject matter of example 5, wherein the indication of the one or more interlaces and PRBs within each of the indicated one or more interlaces for cancellation is based, at least in part, on a subcarrier spacing (SCS) configuration of the wireless station.

Example 7 comprises the subject matter of example 5, wherein indicating the one or more interlaces for cancellation comprises at least one of the following: indicating one or more interlace indices directly; using resource indication value (RIV) definitions to indicate one or more interlaces; or indicating one or more interlace indices using a bitmap.

Example 8 comprises the subject matter of example 5, wherein indicating the PRBs within each of the indicated one or more interlaces for cancellation comprises at least one of the following: indicating one or more PRB indices using a bitmap; indicating one or more PRBs using a starting PRB index and a number of PRBs; or using resource indication value (RIV) definitions to indicate a starting PRB index and a number of PRBs.

According to example 9, a wireless station is disclosed, comprising: a radio; and a processor operably coupled to the radio; wherein the wireless station is configured to: schedule a first uplink (UL) transmission from a wireless device of a set of two or more wireless devices; determine a need for a higher priority uplink transmission that uses resources overlapping with the first UL transmission; determine a reference region, within which a UL cancellation indication (CI) is to be applied; determine a set of UL resources in the reference region for cancellation, wherein at least a subset of the UL resources in the reference region are interlaced; and send, via a downlink (DL) control channel, indication of the determined set of UL resources for cancellation.

Example 10 comprises the subject matter of example 9, wherein the wireless station is further configured to: receive the higher priority uplink transmission via at least a subset of the determined set of cancelled UL resources.

Example 11 comprises the subject matter of example 9, wherein the higher priority uplink transmission comprises a transmission from an Internet of Things (IoT) or Ultra-reliable low latency communication (URLLC) device.

Example 12 comprises the subject matter of example 9, wherein the determined set of UL resources in the reference region for cancellation comprise UL resources in an unlicensed band of frequency spectrum.

Example 13 comprises the subject matter of example 9, wherein the DL control channel comprises a Group-Common Physical Downlink Control Channel (GC-PDCCH).

Example 14 comprises the subject matter of example 9, wherein the wireless station being configured to send, via a DL control channel, indication of the determined set of UL resources for cancellation further comprises the wireless station being configured to: indicate one or more interlaces and Physical Resource Blocks (PRBs) within each of the indicated one or more interlaces for cancellation.

Example 15 comprises the subject matter of example 14, wherein the indication of the one or more interlaces and PRBs within each of the indicated one or more interlaces for cancellation is based, at least in part, on a subcarrier spacing (SCS) configuration of the wireless station.

Example 16 comprises the subject matter of example 14, wherein the wireless station being configured to indicate the one or more interlaces for cancellation comprises the wireless station being configured to perform at least one of the following operations: indicate one or more interlace indices directly; use resource indication value (RIV) definitions to indicate one or more interlaces; or indicate one or more interlace indices using a bitmap.

Example 17 comprises the subject matter of example 14, wherein the wireless station being configured to indicate the PRBs within each of the indicated one or more interlaces for cancellation comprises the wireless station being configured to perform at least one of the following operations: indicate one or more PRB indices using a bitmap; indicate one or more PRBs using a starting PRB index and a number of PRBs; or use resource indication value (RIV) definitions to indicate a starting PRB index and a number of PRBs.

According to example 18, an integrated circuit is disclosed, comprising circuitry configured to cause a wireless station to: schedule a first uplink (UL) transmission from a wireless device of a set of two or more wireless devices; determine a need for a higher priority uplink transmission that uses resources overlapping with the first UL transmission; determine a reference region, within which a UL cancellation indication (CI) is to be applied; determine a set of UL resources in the reference region for cancellation, wherein at least a subset of the UL resources in the reference region are interlaced; and send, via a downlink (DL) control channel, indication of the determined set of UL resources for cancellation.

Example 19 comprises the subject matter of example 18, wherein the higher priority uplink transmission comprises a transmission from an Internet of Things (IoT) or Ultra-reliable low latency communication (URLLC) device.

Example 20 comprises the subject matter of example 18, wherein the determined set of UL resources in the reference region for cancellation comprise UL resources in an unlicensed band of frequency spectrum.

Example 21 comprises the subject matter of example 18, wherein the DL control channel comprises a Group-Common Physical Downlink Control Channel (GC-PDCCH).

Example 22 comprises the subject matter of example 18, wherein the circuitry being configured to cause the wireless station to send, via a DL control channel, indication of the determined set of UL resources for cancellation further comprises circuitry being configured to cause the wireless station: indicate one or more interlaces and Physical Resource Blocks (PRBs) within each of the indicated one or more interlaces for cancellation.

Example 23 comprises the subject matter of example 22, wherein the indication of the one or more interlaces and PRBs within each of the indicated one or more interlaces for cancellation is based, at least in part, on a subcarrier spacing (SCS) configuration of the wireless station.

Example 24 comprises the subject matter of example 22, wherein the circuitry being configured to cause the wireless station to indicate the one or more interlaces for cancellation comprises the circuitry being configured to cause the wireless station to perform at least one of the following operations: indicate one or more interlace indices directly; use resource indication value (RIV) definitions to indicate one or more interlaces; or indicate one or more interlace indices using a bitmap.

Example 25 comprises the subject matter of example 22, wherein the circuitry being configured to cause the wireless station to indicate the PRBs within each of the indicated one or more interlaces for cancellation comprises the circuitry being configured to cause the wireless station to perform at least one of the following operations: indicate one or more PRB indices using a bitmap; indicate one or more PRBs using a starting PRB index and a number of PRBs; or use resource indication value (RIV) definitions to indicate a starting PRB index and a number of PRBs.

According to example 26, a method for communication in a wireless system is disclosed, comprising: requesting transmission, by a wireless device, of uplink (UL) transmissions to a wireless station; receiving, by the wireless device, a UL cancellation indication (CI) to be applied to a determined reference region; determining, by the wireless device, a set of UL resources for cancellation based on the UL CI received from the wireless station, wherein at least a subset of the UL resources for cancellation are interlaced; and canceling, by the wireless device, UL transmissions at least over the determined set of UL resources for cancellation.

Example 27 comprises the subject matter of example 26, further comprising: performing, at the wireless device, UL transmissions that do not overlap with the determined set of UL resources for cancellation in any UL CI to the wireless station.

Example 28 comprises the subject matter of example 26, wherein the determined set of UL resources in the reference region for cancellation comprise UL resources in an unlicensed band of frequency spectrum.

Example 29 comprises the subject matter of example 26, wherein the UL CI is received via a Group-Common Physical Downlink Control Channel (GC-PDCCH).

Example 30 comprises the subject matter of example 26, wherein determining, by the wireless device, the set of UL resources for cancellation based on the UL CI received from the wireless station further comprises: determining one or more indicated interlaces and the Physical Resource Blocks (PRBs) within each of the indicated one or more interlaces for cancellation.

Example 31 comprises the subject matter of example 30, wherein the indication of the one or more interlaces and PRBs within each of the indicated one or more interlaces for cancellation is based, at least in part, on a subcarrier spacing (SCS) configuration of the wireless station.

Example 32 comprises the subject matter of example 30, wherein determining the one or more indicated interlaces for cancellation comprises at least one of the following: determining a direct indication of one or more interlace indices, using resource indication value (RIV) definitions to determine an indication of one or more interlaces; or using a bitmap to determine an indication of one or more interlace indices.

Example 33 comprises the subject matter of example 30, wherein determining the PRBs within each of the indicated one or more interlaces for cancellation comprises at least one of the following: using a bitmap to determine an indication of one or more PRB indices; determining one or more PRBs using a starting PRB index and a number of PRBs; or using resource indication value (RIV) definitions to determine a starting PRB index and a number of PRBs.

According to example 34, a wireless device is disclosed, comprising: a radio; and a processor operably coupled to the radio; wherein the wireless device is configured to: request transmission of uplink (UL) transmissions to a wireless station; receive a UL cancellation indication (CI) to be applied to a determined reference region; determine a set of UL resources for cancellation based on the UL CI received from the wireless station, wherein at least a subset of the UL resources for cancellation are interlaced; and cancel UL transmissions at least over the determined set of UL resources for cancellation.

Example 35 comprises the subject matter of example 34, wherein the wireless device is further configured to: perform UL transmissions that do not overlap with the determined set of UL resources for cancellation in any UL CI to the wireless station.

Example 36 comprises the subject matter of example 34, wherein the determined set of UL resources in the reference region for cancellation comprise UL resources in an unlicensed band of frequency spectrum.

Example 37 comprises the subject matter of example 34, wherein the UL CI is received via a Group-Common Physical Downlink Control Channel (GC-PDCCH).

Example 38 comprises the subject matter of example 34, wherein the wireless device being configured to determine the set of UL resources for cancellation based on the UL CI received from the wireless station further comprises the wireless device being configured to: determine one or more indicated interlaces and the Physical Resource Blocks (PRBs) within each of the indicated one or more interlaces for cancellation.

Example 39 comprises the subject matter of example 38, wherein the indication of the one or more interlaces and PRBs within each of the indicated one or more interlaces for cancellation is based, at least in part, on a subcarrier spacing (SCS) configuration of the wireless station.

Example 40 comprises the subject matter of example 38, wherein the wireless device being configured to determine the one or more indicated interlaces for cancellation comprises the wireless device performing at least one of the following operations: determine a direct indication of one or more interlace indices; use resource indication value (RIV) definitions to determine an indication of one or more interlaces; or use a bitmap to determine an indication of one or more interlace indices.

Example 41 comprises the subject matter of example 38, wherein the wireless device being configured to determine the PRBs within each of the indicated one or more interlaces for cancellation comprises the wireless device performing at least one of the following operations: use a bitmap to determine an indication of one or more PRB indices; determine one or more PRBs using a starting PRB index and a number of PRBs; or use resource indication value (RIV) definitions to determine a starting PRB index and a number of PRBs.

Example 42 comprises the subject matter of example 34, wherein the wireless device does not comprise an Internet of Things (IoT) or Ultra-reliable low latency communication (URLLC) device.

According to example 43, an integrated circuit is disclosed, comprising circuitry configured to cause a wireless device to: request transmission of uplink (UL) transmissions to a wireless station; receive a UL cancellation indication (CI) to be applied to a determined reference region; determine a set of UL resources for cancellation based on the UL CI received from the wireless station, wherein at least a subset of the UL resources for cancellation are interlaced; and cancel UL transmissions at least over the determined set of UL resources for cancellation.

Example 44 comprises the subject matter of example 43, wherein the circuitry is further configured to cause the wireless device to: perform UL transmissions that do not overlap with the determined set of UL resources for cancellation in any UL CI to the wireless station.

Example 45 comprises the subject matter of example 43, wherein the determined set of UL resources in the reference region for cancellation comprise UL resources in an unlicensed band of frequency spectrum.

Example 46 comprises the subject matter of example 43, wherein the UL CI is received via a Group-Common Physical Downlink Control Channel (GC-PDCCH).

Example 47 comprises the subject matter of example 43, wherein the circuitry being configured to cause the wireless device to determine the set of UL resources for cancellation based on the UL CI received from the wireless station further comprises the circuitry being configured to cause the wireless device to; determine one or more indicated interlaces and the Physical Resource Blocks (PRBs) within each of the indicated one or more interlaces for cancellation.

Example 48 comprises the subject matter of example 47, wherein the indication of the one or more interlaces and PRBs within each of the indicated one or more interlaces for cancellation is based, at least in part, on a subcarrier spacing (SCS) configuration of the wireless station.

Example 49 comprises the subject matter of example 47, wherein the circuitry being configured to cause the wireless device to determine the one or more indicated interlaces for cancellation comprises the circuitry being configured to cause the wireless device to perform at least one of the following operations: determine a direct indication of one or more interlace indices; use resource indication value (RIV) definitions to determine an indication of one or more interlaces; or use a bitmap to determine an indication of one or more interlace indices.

Example 50 comprises the subject matter of example 47, wherein the circuitry being configured to cause the wireless device to determine the PRBs within each of the indicated one or more interlaces for cancellation comprises the circuitry being configured to cause the wireless device to perform at least one of the following operations: use a bitmap to determine an indication of one or more PRB indices; determine one or more PRBs using a starting PRB index and a number of PRBs; or use resource indication value (RIV) definitions to determine a starting PRB index and a number of PRBs.

Yet another example may include a method, comprising, by a device, performing any or all parts of the preceding examples.

A yet further exemplary embodiment may include a non-transitory computer-accessible memory medium comprising program instructions which, when executed at a device, cause the device to implement any or all parts of any of the preceding Examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of the methods described herein, or, any combination of the methods described herein, or, any subset of any of the methods described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various methods described herein (or, any combination of the methods described herein, or, any subset of any of the methods described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method for communication in a wireless system, comprising:
   scheduling, by a wireless station, a first uplink (UL) transmission from a wireless device of a set of two or more wireless devices;
   determining, by the wireless station, a need for a higher priority uplink transmission that uses resources overlapping with the first UL transmission;
   determining, by the wireless station, a reference region, within which a UL cancellation indication (CI) is to be applied;
   determining, by the wireless station, a set of UL resources in the reference region for cancellation, wherein at least a subset of the UL resources in the reference region are interlaced;
   sending, via a downlink (DL) control channel, indication of the determined set of UL resources for cancellation; and
   receiving, at the wireless station, the higher priority uplink transmission via at least a subset of the determined set of cancelled UL resources.

2. The method of claim 1, wherein the higher priority uplink transmission comprises a transmission from an Internet of Things (IoT) or Ultra-reliable low latency communication (URLLC) device.

3. The method of claim 1, wherein the determined set of UL resources in the reference region for cancellation comprise UL resources in an unlicensed band of frequency spectrum.

4. The method of claim 1, wherein the DL control channel comprises a Group-Common Physical Downlink Control Channel (GC-PDCCH).

5. The method of claim 1, wherein sending, via a DL control channel, indication of the determined set of UL resources for cancellation further comprises:
   indicating one or more interlaces and Physical Resource Blocks (PRBs) within each of the indicated one or more interlaces for cancellation.

6. The method of claim 5, wherein the indication of the one or more interlaces and PRBs within each of the indicated one or more interlaces for cancellation is based, at least in part, on a subcarrier spacing (SCS) configuration of the wireless station.

7. The method of claim 5, wherein indicating the one or more interlaces for cancellation comprises at least one of the following:
   indicating one or more interlace indices directly;
   using resource indication value (RIV) definitions to indicate one or more interlaces; or
   indicating one or more interlace indices using a bitmap.

8. The method of claim 5, wherein indicating the PRBs within each of the indicated one or more interlaces for cancellation comprises at least one of the following:
   indicating one or more PRB indices using a bitmap;
   indicating one or more PRBs using a starting PRB index and a number of PRBs; or
   using resource indication value (RIV) definitions to indicate a starting PRB index and a number of PRBs.

9. A wireless station comprising:
   a radio; and
   a processor operably coupled to the radio;
   wherein the wireless station is configured to:
     schedule a first uplink (UL) transmission from a wireless device of a set of two or more wireless devices;
     determine a need for a higher priority uplink transmission that uses resources overlapping with the first UL transmission;
     determine a reference region, within which a UL cancellation indication (CI) is to be applied;
     determine a set of UL resources in the reference region for cancellation, wherein at least a subset of the UL resources in the reference region are interlaced; and
     send, via a downlink (DL) control channel, indication of the determined set of UL resources for cancellation.

10. The wireless station of claim 9, wherein the wireless station is further configured to:
    receive the higher priority uplink transmission via at least a subset of the determined set of cancelled UL resources.

11. The wireless station of claim 9, wherein the higher priority uplink transmission comprises a transmission from an Internet of Things (IoT) or Ultra-reliable low latency communication (URLLC) device.

12. The wireless station of claim 9, wherein the determined set of UL resources in the reference region for cancellation comprise UL resources in an unlicensed band of frequency spectrum.

13. The wireless station of claim 9, wherein the DL control channel comprises a Group-Common Physical Downlink Control Channel (GC-PDCCH).

14. The wireless station of claim 9, wherein the wireless station being configured to send, via a DL control channel, indication of the determined set of UL resources for cancellation further comprises the wireless station being configured to:
    indicate one or more interlaces and Physical Resource Blocks (PRBs) within each of the indicated one or more interlaces for cancellation.

15. The wireless station of claim 14, wherein the indication of the one or more interlaces and PRBs within each of the indicated one or more interlaces for cancellation is based, at least in part, on a subcarrier spacing (SCS) configuration of the wireless station.

16. The wireless station of claim 14, wherein the wireless station being configured to indicate the one or more interlaces for cancellation comprises the wireless station being configured to perform at least one of the following operations:

indicate one or more interlace indices directly;

use resource indication value (RIV) definitions to indicate one or more interlaces; or indicate one or more interlace indices using a bitmap.

17. The wireless station of claim 14, wherein the wireless station being configured to indicate the PRBs within each of the indicated one or more interlaces for cancellation comprises the wireless station being configured to perform at least one of the following operations:

indicate one or more PRB indices using a bitmap;

indicate one or more PRBs using a starting PRB index and a number of PRBs; or use resource indication value (RIV) definitions to indicate a starting PRB index and a number of PRBs.

18. An integrated circuit, comprising circuitry configured to cause a wireless station to:

schedule a first uplink (UL) transmission from a wireless device of a set of two or more wireless devices;

determine a need for a higher priority uplink transmission that uses resources overlapping with the first UL transmission;

determine a reference region, within which a UL cancellation indication (CI) is to be applied;

determine a set of UL resources in the reference region for cancellation, wherein at least a subset of the UL resources in the reference region are interlaced; and send, via a downlink (DL) control channel, indication of the determined set of UL resources for cancellation.

19. The integrated circuit of claim 18, wherein the circuitry being configured to cause the wireless station to send, via a DL control channel, indication of the determined set of UL resources for cancellation further comprises circuitry being configured to cause the wireless station:

indicate one or more interlaces and Physical Resource Blocks (PRBs) within each of the indicated one or more interlaces for cancellation.

20. The integrated circuit of claim 19, wherein the indication of the one or more interlaces and PRBs within each of the indicated one or more interlaces for cancellation is based, at least in part, on a subcarrier spacing (SCS) configuration of the wireless station.

* * * * *